US007421082B2

(12) United States Patent
Kamiya et al.

(10) Patent No.: US 7,421,082 B2
(45) Date of Patent: Sep. 2, 2008

(54) DATA DELIVERY METHOD AND DATA DELIVERY SYSTEM USING SETS OF PASSKEYS GENERATED BY DIVIDING AN ENCRYPTION KEY

(75) Inventors: Shigeki Kamiya, Tokyo (JP); Masami Yamashita, Tokyo (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 10/032,722

(22) Filed: Oct. 27, 2001

(65) Prior Publication Data

US 2002/0106086 A1    Aug. 8, 2002

(30) Foreign Application Priority Data

Dec. 28, 2000  (JP)  ............................. 2000-403471
Mar. 16, 2001  (JP)  ............................. 2001-076917

(51) Int. Cl.
*H04L 9/08*  (2006.01)
*H04N 7/167*  (2006.01)

(52) U.S. Cl. .................. 380/278; 380/277; 380/281; 380/282; 380/283; 713/162; 725/31

(58) Field of Classification Search ................ 380/277, 380/281–282, 283; 713/162; 725/31
See application file for complete search history.

(56) References Cited

U.S. PATENT DOCUMENTS

| | | | | |
|---|---|---|---|---|
| 5,309,516 A * | 5/1994 | Takaragi et al. | ................ | 380/45 |
| 5,748,734 A * | 5/1998 | Mizikovsky | ................. | 380/247 |
| 5,991,399 A * | 11/1999 | Graunke et al. | ............. | 380/279 |
| 6,055,314 A | 4/2000 | Spies et al. | | |
| 6,182,214 B1 * | 1/2001 | Hardjono | ..................... | 713/163 |
| 6,295,359 B1 * | 9/2001 | Cordery et al. | ................ | 380/44 |
| 6,381,331 B1 * | 4/2002 | Kato | ............................ | 380/37 |
| 6,636,968 B1 * | 10/2003 | Rosner et al. | ................ | 713/178 |
| 6,907,127 B1 * | 6/2005 | Kravitz et al. | ................ | 380/277 |
| 6,917,685 B1 * | 7/2005 | Watanabe et al. | ............ | 380/262 |
| 6,934,392 B1 * | 8/2005 | Vanstone | ...................... | 380/278 |
| 6,959,090 B1 * | 10/2005 | Alve et al. | .................... | 380/277 |

(Continued)

FOREIGN PATENT DOCUMENTS

EP        0 800 293        10/1997

(Continued)

OTHER PUBLICATIONS

Schneier, Bruce, "Applied Cryptography Second Edition", John Wiley and Sons, pp. 225.*

(Continued)

*Primary Examiner*—Ayaz Sheikh
*Assistant Examiner*—Matthew T Henning
(74) *Attorney, Agent, or Firm*—Frommer Lawrence & Haug LLP; William S. Frommer

(57) ABSTRACT

A data delivery system providing multipoint delivery of encrypted digital data to specific destinations. A plurality of pieces of key information are generated on the basis of an encryption key specific to each digital data item to be delivered. The multiple pieces of key information are delivered over routes which differ from the routes used to deliver the digital data and which further differ from each other. Physically different media or transmission over a network at different times are used to separately transmit different sets of key information.

9 Claims, 18 Drawing Sheets

U.S. PATENT DOCUMENTS

| | | | |
|---|---|---|---|
| 6,965,992 B1* | 11/2005 | Joseph et al. | 713/153 |
| 7,039,803 B2* | 5/2006 | Lotspiech et al. | 713/163 |
| 7,065,216 B1* | 6/2006 | Benaloh et al. | 380/282 |
| 7,065,642 B2* | 6/2006 | Sandhu et al. | 713/155 |
| 2001/0007127 A1* | 7/2001 | Staring | 713/160 |

FOREIGN PATENT DOCUMENTS

| | | |
|---|---|---|
| WO | WO 00 59154 | 10/2000 |

OTHER PUBLICATIONS

Schneier, Bruce "Applied Cryptography"Second Edition 1996, Wiley and Sons, pp. 70-71; 177.*

Wenjing Lou; Yuguang Fang, "A multipath routing approach for secure data delivery," Military Communcations Conference, 2001, MILCOM 2001. Communications for Network-Centric Operations: Creating the Information Force, IEEE. vol. 2, No., pp. 1467-1473 vol. 2, 2001.*

Schneier B: "Applied Cryptography" Applied Cryptography. Protocols Algorithms, and Source Code In C, New York, John Wiley & Sons, US, 1996, pp. 176-177, XP002148578 ISBN: 0-471-11709-9.

* cited by examiner

FIG. 18

| | ENCRYPTION KEY GENERATED BY | CONTENT CODED BY | ENCRYPTION DONE BY | KEY INFORMATION DELIVERED BY | SYSTEM SECURITY FROM THE VIEWPOINT OF DISTRIBUTION RIGHT HOLDER | REMARKS |
|---|---|---|---|---|---|---|
| 1 | PRODUCTION FIRM | PRODUCTION FIRM | PRODUCTION FIRM | PRODUCTION FIRM (2 KEYS) | +++ | |
| 2 | DO. | DO. | DO. | PRODUCTION FIRM (1 KEY) + DELIVERY AGENT (1 KEY) | ++ | DELIVERY AGENT ACQUIRES THE ENCRYPTED ENCRYPTION KEY |
| 3 | DO. | DO. | DO. | DELIVERY AGENT (2 KEYS) | ++ | DELIVERY AGENT ACQUIRES THE ENCRYPTION KEY AND GENERATES KEY INFORMATION ACCORDINGLY |
| 4 | DO. | DO. | DELIVERY AGENT | PRODUCTION FIRM (2 KEYS) | ++ | THE ENCRYPTION KEY IS SENT TO DELIVERY AGENT |
| 5 | DO. | DO. | DO. | PRODUCTION FIRM (1 KEY) + DELIVERY AGENT (1 KEY) | ++ | DO. |
| 6 | DO. | DO. | DO. | DELIVERY AGENT (2 KEYS) | ++ | DO. |
| 7 | DO. | DELIVERY AGENT | DO. | PRODUCTION FIRM (2 KEYS) | ++ | DO. |
| 8 | DO. | DO. | DO. | PRODUCTION FIRM (1 KEY) + DELIVERY AGENT (1 KEY) | ++ | DO. |
| 9 | DO. | DO. | DO. | DELIVERY AGENT (2 KEYS) | ++ | DO. |
| 10 | DELIVERY AGENT | PRODUCTION FIRM | PRODUCTION FIRM | PRODUCTION FIRM (2 KEYS) | + | PRODUCTION FIRM ACQUIRES THE ENCRYPTION KEY AND GENERATES KEY INFORMATION ACCORDINGLY |
| 11 | DO. | DO. | DO. | PRODUCTION FIRM (1 KEY) + DELIVERY AGENT (1 KEY) | + | DO. |
| 12 | DO. | DO. | DO. | DELIVERY AGENT (2 KEYS) | + | DO. |
| 13 | DO. | DO. | DELIVERY AGENT | PRODUCTION FIRM (2 KEYS) | + | DO. |
| 14 | DO. | DO. | DO. | PRODUCTION FIRM (1 KEY) + DELIVERY AGENT (1 KEY) | + | DO. |
| 15 | DO. | DO. | DO. | DELIVERY AGENT (2 KEYS) | + | DO. |
| 16 | DO. | DELIVERY AGENT | DO. | PRODUCTION FIRM (2 KEYS) | + | DO. |
| 17 | DO. | DO. | DO. | PRODUCTION FIRM (1 KEY) + DELIVERY AGENT (1 KEY) | + | DO. |
| 18 | DO. | DO. | DO. | DELIVERY AGENT (2 KEYS) | + | DO. |

DATA DELIVERY METHOD AND DATA DELIVERY SYSTEM USING SETS OF PASSKEYS GENERATED BY DIVIDING AN ENCRYPTION KEY

BACKGROUND OF THE INVENTION

The present invention relates to a method and a system for securely delivering encrypted digital data.

Extraordinary headway in digital technology today has made it possible to deliver all kinds of digital data over networks or by means of storage media. Such data include character data (e.g., text, symbols and figures), audio data (voices and pieces of music), video data (still and moving pictures), audio-video composite data (movies and broadcast programs), program data, database data and others, typically referred to as content data, or simply content.

Some digital data delivered may consist of a single data file; others may be composed of a plurality of data files. Some of such data files may have information composed of a single content; others may include information constituted by multiple contents. Each of these contents may be divided into a plurality of digital data.

It is not difficult to make perfect copies of digital data. Once unauthorized copies are made (e.g., through unauthorized decoding and reproduction, unlawful duplication, or illicit diversion of products to the black market), copyright holders and others involved in the legitimate creation, display or delivery of content may suffer significant economic injury or other damage. Concern over such unauthorized practices has accelerated the recent move to establish a framework for protection of content providers (such as content producers, distributors and deliverers). In particular, the possibility of devising measures to deter unauthorized copies is being explored to protect valuable contents that take enormous cost and labor to produce (such as movies).

The present invention is intended to defeat unauthorized copying, reproduction, diversion, etc. of content; and provides a technique for delivering digital data in a secure manner that makes illicit copying difficult.

SUMMARY OF THE INVENTION

In accordance with the present invention, digital data, or content, is delivered from an upstream system to a downstream system. The upstream system performs multipoint delivery of encrypted digital data. Encryption may be specific to each item of the digital data to be delivered (i.e., each digital data item may be encrypted by use of a unique encryption key); however, this is not intended to limit the present invention solely thereto. Of course, if each digital data item to be delivered is encrypted uniquely, any economic injury or damage resulting from unauthorized decryption would be minimized because the corresponding data item alone is affected. But, if the delivery system is deemed highly secure or if a simplified delivery system is desired, a plurality of digital data items may be encrypted by a common encryption process. The particular encryption scheme that is adopted depends upon the requirements of the business in question (e.g. movies may adopt one encryption technique, whereas the delivery of software programs may adopt another). Multipoint data delivery may be carried out not only via transmission media such as broadcasting or communication networks but also through physical storage media.

To permit an authorized user to decrypt the delivered digital data, an encryption key used to encrypt the digital data also is delivered. The upstream system generates a plurality of pieces of key information specific to destinations and/or to the digital data to be delivered. These pieces of key information are delivered to the corresponding destinations (i.e., to the downstream system) over delivery routes different from those that carry the encrypted digital data, or content. All delivery routes are made different or separate from one another either physically or temporally, i.e., by staggering the times for delivery. Where the key information is delivered in multiple pieces over a plurality of routes, the unauthorized appropriation of one piece of key information will not compromise the corresponding content data unless and until all other pieces of key information are also appropriated. The key information to be delivered is not limited to encryption keys alone; it may also be information from which such encryption keys may be reconstructed or reproduced (e.g., random numbers). The key information may be made up of a set of passkeys or partial keys, i.e., keys furnished by splitting up a whole encryption key. The encryption scheme may be a common key cryptosystem, a public key cryptosystem, or a combination of the two systems.

Examples of how the keys may be generated include:

EXAMPLE I

Dividing the encryption key by a division pattern specific to each delivery destination into a set of partial keys (at least two keys) for the destination of interest.

EXAMPLE II

Generating another encryption key (a second encryption key) specific to each different destination, and using that other encryption key in question (i.e. the second encryption key) to encrypt the first encryption key that is used to encrypt digital data.

EXAMPLE III

Generating an additional encryption key (the second encryption key) specific to each different digital data item, and using the additional encryption key in question (i.e. the second encryption key) to encrypt the first encryption key that is used to encrypt the digital data.

Not only one but also two or more of these second encryption keys may be used in a manner specific to each different destination. In that case, the multiple second encryption keys may be used to encrypt the first encryption key a number of times. In any event, the first encryption key is encrypted at least once by the second encryption key or keys. Other encryption schemes may also be envisaged, with the second encryption key combined with other encryption keys (such as an encryption key common to destinations, an encryption key specific to each digital data item, an encryption key common to multiple digital data items, etc.) to implement multiple encryption processes.

A key division pattern and/or an encryption key specific to each destination may be provided either in a generalized manner (i.e., the same encryption key is used for a relatively long period of time, regardless of digital data, before it is changed over) or in a manner varying with each batch of digital data to be delivered. Obviously the latter scheme is preferred for protection against unauthorized use or appropriation of encrypted content.

Multipoint delivery may be implemented either electronically over networks, such as the internet or broadcasting or communication channels, or physically through the use of storage media.

The downstream system restores the original encryption key from the plurality of pieces of key information delivered over a plurality of different delivery routes, and uses the restored encryption key to decrypt the delivered digital data and thereby output the original data, or content, in a suitable format. Obviously the downstream system also needs to be structured so as to ensure protection against unauthorized use or appropriation. Illustratively, as will be described later in connection with preferred embodiments, there may be provided a downstream system having a decryption server and an output device connected in a way to assure the secrecy of communication. The output device may incorporate in the same physical housing not only a decrypter and a content decoder but also a secrecy-assuring output unit such as a descrambler.

In order to prevent unauthorized use or misappropriation, the downstream system may be composed of housings that can be unsealed (or opened) only by following an authorized procedure; the system will be disabled if unsealed otherwise. The authorized procedure to unseal the housing(s) may involve authorized personnel using proprietary electronic or physical keys to open the housing. An example of unauthorized unsealing of the system is the destruction or forced opening of the housing.

It is expected, but not required, that the upstream and downstream systems will be set up and run by different organizations, or companies. It also is contemplated that the company running the upstream system may take over various processes ranging from encryption to decryption of the digital data that is delivered. The upstream system may be operated in various ways. Illustratively, a single company may operate the system, or a plurality of companies may jointly operate the upstream system. Each of the processes carried out in accordance with the present invention may be implemented by a single company or by multiple enterprises. For example, a single company may have the right to distribute content and may deliver the content as well. The single company may be an entity that is recognized as a substantially unified whole in corporate terms. In this connection, the business of the company may be divided into operational units that are implemented by affiliated companies or like entities which may not be legal subsidiaries of a single corporation but nevertheless may be associated with a single holding company.

If the upstream system is operated by multiple companies, the particular processing function that is assigned to an individual company is determined by the requirements of the enterprise. It will be appreciated that a large number of combinations of particular hardware and software components may be employed by the different companies involved.

As an example, a company having the right to distribute content may also encrypt the data and generate multiple pieces of key information with regard to each destination, and another company may deliver the encrypted data to those destinations. In this example, only the company having the distribution rights knows the encryption keys (master keys). Consequently, it is relatively easy for the distribution rights holder to maintain data security. The distribution rights holder may be an entrepreneur who has obtained those rights from the content producer, (that is, the entrepreneur may or may not be the same as the content producer).

Although the ensuing description of the present invention does not refer specifically to digital watermarking, it is preferred to include such watermarking before the digital data is encrypted in order to discourage unauthorized duplication and to identify unlawfully diverted digital products.

A data delivery company or a network administrator may add encryption processing to those delivery channels over which encrypted digital data is delivered. In fact, where key information is distributed, it is preferred that each destination be authenticated by a digital certificate (i.e., certified with a digital signature by an authentication organization) before the key information is encrypted by a public key (such as a public key furnished by each destination). This practice will further ensure data security.

In the present description, keys that are obtained directly from an encryption key by dividing the latter are referred to as passkeys, and keys generated by further dividing a passkey are called partial keys. Both passkeys and partial keys are the same in nature in that they are part of the initial encryption key. In the description that follows, keys used to encrypt the encryption key are called multiple keys. The process used to encrypt an encryption key may be performed once or a number of times before the encrypted encryption key is delivered to a destination.

Where key information is delivered over a network, that network can be physically the same as that for content transmission. In that case, however, content and key information are not delivered simultaneously; preferably they are transmitted at different times, for example, hours or days apart. This is equivalent to delivering content and key information over different routes. If the content (or digital data) and key information were sent over the same delivery route, a single unauthorized act of misappropriation could divert part of the digital data and key information at the same time, thereby increasing the possibility of fraudulent decryption of the encrypted digital data.

In the present invention, it is assumed that the downstream system either has advance knowledge of the information needed to restore the initial encryption key from the delivered key information, or is provided with this information from the upstream system. The information may be sent from the upstream system to the downstream system either simultaneously during key information delivery or at a different time.

According to one aspect of the invention, there is proposed a data delivery system comprising an upstream system and a downstream system, with the upstream system being operated by a company having the distribution rights to the digital data, or being operated jointly by the distribution rights company and a company that delivers the digital data. The digital data is encrypted by the upstream system using an encryption key. A set of passkeys (two or more keys making up one set) unique to each of specific destinations is generated, based on the encryption key. Either the set of passkeys or passkey information from which these passkeys may be reproduced is delivered to each destination over a plurality of delivery routes which differ from the routes used to deliver the digital data and which are further different from each other. The encrypted digital data also is delivered to the destinations.

The encryption key is restored by the downstream system (set up at each destination) using either the delivered set of passkeys or the passkey information; and the encrypted digital data is decrypted by using the restored encryption key.

The encryption key used to encrypt digital data is divided, or parsed, by a protocol (i.e. a division rule) specific to each destination (i.e., downstream system) into a set of passkeys (e.g., three passkeys). These passkeys are delivered to the destination in question over routes which differ from the content delivery routes and which are further different from each other.

The signal processing of the data delivery system may be implemented either by hardware or by software.

The data delivery system delivers a plurality of pieces of key information over multiple delivery routes so that any one piece of key information that might be misappropriated will not lead to unauthorized tapping of the encryption key unless and until all other key information is misappropriated. In particular, where key information is delivered over routes different from those which carry digital data (including use of the same medium at different times), then even if one who misappropriates part of the key information happens to acquire encrypted digital data as well, the fact that the key information needed to restore the initial encryption key is delivered separately from the digital data makes it more difficult to recover that initial encryption key and decrypt the digital data.

Although the data delivery system thus far described presupposes the prior existence of an encryption key for encrypting digital data, this is not intended to limit the present invention. The encryption key may be either generated within the upstream system or supplied from outside the upstream system. The encryption key may be either specific to each digital data item (i.e. to each content) or common to a plurality of digital data items. If data item-specific encryption keys are used, unauthorized decryption of any one key limits the damage to the corresponding data item alone. The use of common keys, however, is not too vulnerable to the damage caused by misappropriation as long as the keys are changed fairly frequently.

The data delivery system may deliver key information in diverse ways. Illustratively, a portion of a set of passkeys may be transmitted over a network and the remaining passkeys may be delivered by use of a storage medium (e.g. by mailing a CD-ROM or a floppy disc or a solid state memory). If a portion of the key information is delivered using a tangible storage medium, it is easier both to discover misappropriation of the key information and to take countermeasures promptly.

As another alternative, a portion of a set of passkeys may be transmitted over a first network and the remaining passkeys may be delivered over a second network. One advantage of delivering all key information over networks is that any time constraints on delivery are minimized. Another advantage is the reduced cost of key information delivery. In implementing the delivery of key information over networks, it is preferred illustratively to authenticate each destination using a digital certificate encrypted by a public key furnished by the destination in question, prior to delivery of the key information.

As a further alternative, a portion of a set of passkeys may be delivered on a first storage medium and the remaining passkeys may be delivered on a second storage medium. When all key information is delivered by use of tangible storage media, it becomes much easier to discover misappropriation of the key information and to take countermeasures promptly. The two storage media preferably are physically different. Obviously the type of medium and the manner in which information is read therefrom may or may not be the same for the two storage media employed.

The storage media used to carry passkeys may include magnetically readable media such as magnetic tapes, floppy disks and magnetic cards; optically readable media such as CD-ROMs, MOs, CD-Rs and DVDs; semiconductor memories such as memory cards (rectangular type, square type, etc.) and IC cards; and others. The storage media with key information recorded thereon may be delivered by postal service or by a commercial delivery service. At present, the storage media are sent most often by registered mail in order to ensure their security.

As a feature of this invention, a plurality of partial keys is generated based on a portion of either the set of passkeys or the passkey information. Either the plurality of partial keys or partial key information (from which these partial keys may be reproduced), as well as either the remaining passkeys not used to generate the partial keys or the remaining passkey information, is delivered to each destination over a plurality of delivery routes which differ from the routes used for delivering content (e.g. the digital data) and which are further different from each other.

The downstream system restores the encryption key of the delivered digital data using either the plurality of partial keys or the partial key information, as well as the remaining passkeys or the remaining passkey information delivered over the plurality of delivery routes.

Using the example described above wherein the encryption key is divided into a set of passkeys (e.g., three passkeys), a portion of the passkeys (e.g., two passkeys) is delivered directly to each destination, with the remaining passkey (e.g., one passkey) being further divided into a plurality of partial keys for delivery. All of the key information is delivered to each destination over routes which differ from routes used to deliver the digital data and which are further different from each other.

Here, a plurality of pieces of key information are delivered over multiple delivery routes so that any one piece of key information that might be misappropriated will not lead to unauthorized tapping of the encryption key unless and until all of the other key information is misappropriated. Because this data delivery system offers more delivery routes for key information than described above, there is higher security against misappropriation or fraud.

The division rule or protocol used to generate a set of partial keys based on the passkeys may be common to all destinations, unique to each destination, or specific to a group of destinations classified by geographical or other conditions. Instead of having a portion of the passkeys divided into partial keys, that portion may be encrypted by multiple keys. In this case, both the encrypted passkeys and the encryption keys used to encrypt the passkeys are delivered to each destination. For delivery, a portion of the passkeys is transmitted over a network, a portion of the partial keys that are generated from the remaining passkeys also is sent over the network, and the remaining partial keys, or partial key information, are delivered on a storage medium. The storage medium may carry any part of the key information involved, and any two different types of key information may be delivered on two different storage media.

For example, a portion of a set of passkeys and all the partial keys generated from the remaining passkeys may be transmitted over the network. If all key information is delivered over the network, any time constraints on delivery are minimized and the cost of key information delivery is reduced. In delivering key information over the network, it is preferred to authenticate each destination using a digital certificate encrypted by a public key furnished by the destination in question prior to delivery of the key information.

As another example, a portion of a set of passkeys and all partial keys generated from the remaining passkeys may be delivered on storage media. When all key information is delivered by use of tangible storage media, it is easier to discover misappropriation of the information and to take countermeasures promptly.

As another feature of this invention, a second encryption key specific to each of specific destinations and/or to digital data is used to encrypt either the first encryption key or the key information (from which the first encryption key may be reproduced). Both the encrypted first encryption key (or key information) and the second encryption key (or key information from which the second encryption key may be reproduced), are delivered to each destination over a plurality of delivery routes which differ from the routes used to deliver the content and which are further different from each other.

The downstream system restores the first encryption key by decrypting either the encrypted first encryption key or the encrypted key information delivered thereto, on the basis of either the delivered second encryption key or the delivered second encryption key information. The restored first encryption key is used to decrypt the encrypted content.

Where the second encryption key is unique to each destination, the encrypted digital data cannot be decrypted without authorization unless and until all key information (i.e., the second encryption key and the encrypted first encryption key) is misappropriated from the destination in question. That is, even if the second encryption key unique to a given destination and the encrypted first encryption key specific to another destination are misappropriated, the first encryption key cannot be restored. It is quite difficult, if not practically impossible, for all data to be misappropriated before the theft is discovered. This provides a system highly resistant to attempts at unauthorized use or even theft of data. If the second encryption key is unique to each digital data item, then even if the second encryption key and the unencrypted first encryption key are misappropriated, any injury will be limited only to the digital data item in question (assuming of course that the encrypted digital data item also is misappropriated). Needless to say, if the second encryption key is specific both to a particular destination and to a particular digital data item, the system would be further resistant to unauthorized tapping of data.

The first encryption key need only be encrypted once by the second encryption key, although multiple encryptions may be used. For example, the first encryption key may be encrypted before it is further encrypted by the second encryption key.

As one example of the delivery technique, the encrypted first encryption key is transmitted over a network, and the second encryption key is delivered on a storage medium. Alternatively, the first encryption key may be carried on the storage medium and the second encryption key transmitted over the network.

As another example, the encrypted first encryption key may be transmitted over a first network and the second encryption key over a second network. Alternatively, the encrypted first encryption key may be delivered on a first storage medium and the second encryption key on a second storage medium.

As a further feature of this invention, when a second encryption key specific to a specific destination and/or to particular content is used to encrypt the first encryption key, a set of passkeys (e.g. three passkeys) based on the second encryption key is generated; and the encrypted first encryption key (or first encryption key information), as well as the set of passkeys (or passkey information from which the set of passkeys may be reproduced) are delivered to each destination over a plurality of delivery routes which differ from the content delivery routes and from each other.

The downstream system uses the set of passkeys (or passkey information) to restore the second encryption key; and the restored second encryption key is used to decrypt the first encryption key (or the first encryption key information). As a result, the first encryption key is restored and used to decrypt the encrypted content. Preferably, the set of passkeys, rather than the second encryption key itself, is delivered together with the encrypted first encryption key to each destination over a plurality of different delivery routes. Consequently, even if one piece of key information is misappropriated, this will not lead to unauthorized tapping of the encryption key unless and until all other key information is misappropriated.

To generate a set of passkeys based on the second encryption key, the second encryption key may be divided into passkeys in accordance with a suitable division rule, or protocol, as mentioned earlier. Alternatively, another encryption key may be used to further encrypt the second encryption key to generate the passkeys.

If the second encryption key is unique to a particular destination, unless all key information is misappropriated from that specific destination (i.e., the set of passkeys and the encrypted first encryption key), the encrypted digital data cannot be decrypted. This provides a more effective data delivery system.

As one example of this feature, the encrypted first encryption key is delivered on a storage medium, a portion of the (or, alternatively, the entire) set of passkeys is transmitted over a network, and the remaining passkeys are delivered on another storage medium. When part of the key information is delivered on tangible storage media, it is easier to discover misappropriation of the information and to take countermeasures immediately.

As another example, the encrypted first encryption key and the set of passkeys generated from the second encryption key all may be transmitted over the network. When all key information is delivered over the network, any time constraints on key delivery are minimized, thereby reducing the cost of key information delivery. Preferably, a digital certificate encrypted by a public key is furnished by the destination in question prior to delivery of key information to authenticate that destination.

BRIEF DESCRIPTION OF THE DRAWINGS

FIG. 18 is a summary table of the characteristics of arrangements, known as operation platforms, used with the data delivery systems in accordance with the present invention.

DESCRIPTION OF THE PREFERRED EMBODIMENTS

Figure 1:
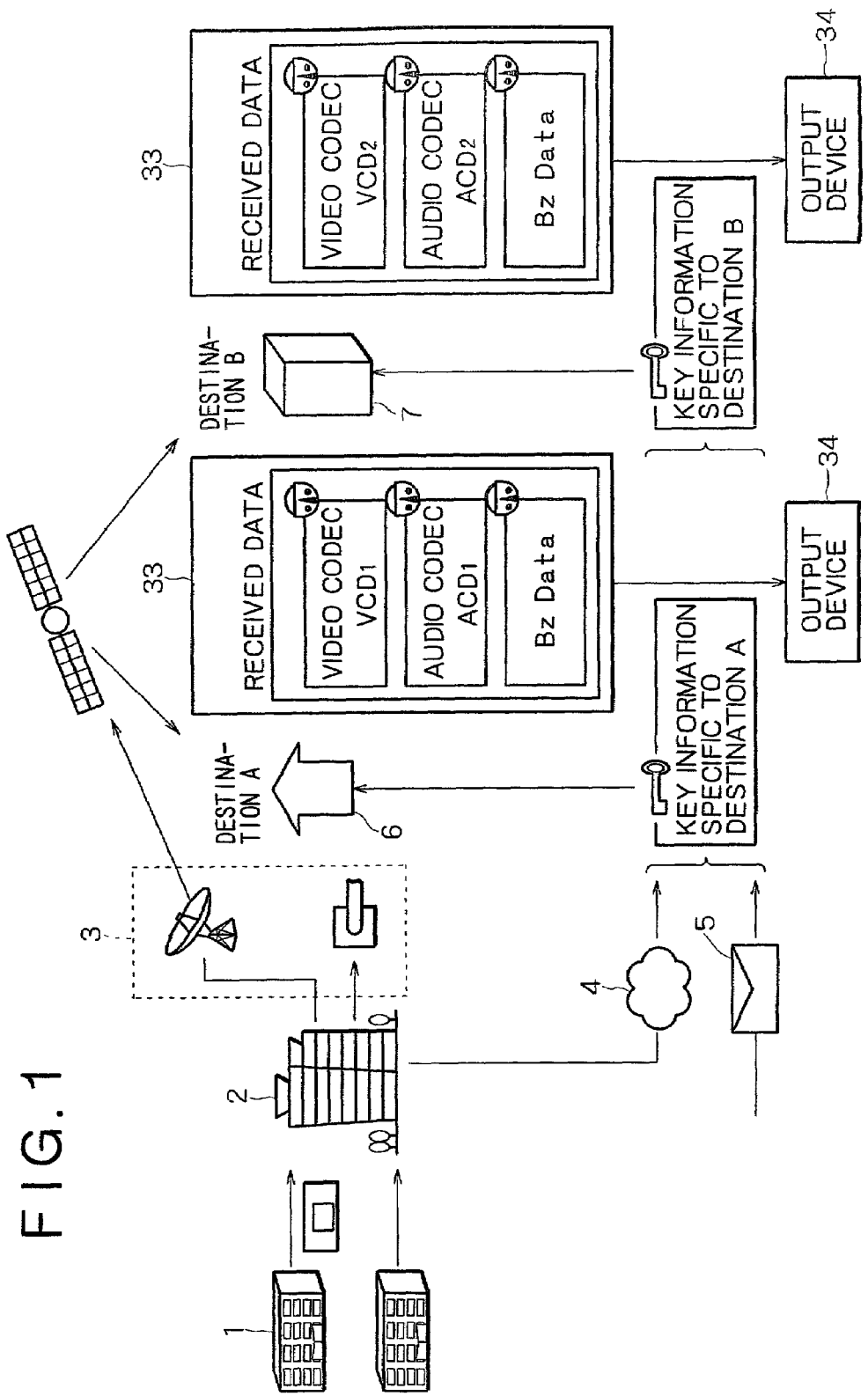
FIG. 1 is a schematic diagram representing the typical structure of a data delivery system according to the invention.

FIG. 1 schematically represents a system envisaged by this invention, in which a delivery agent delivers digital data to multiple destinations. In the depicted arrangement, the delivery agent includes a distribution rights holder 1 possessing the right to distribute content (i.e. digital data) and a delivery business operator 2 who delivers, or transmits, content. The distribution rights holder and the delivery agent may be the same entity or they may be different entities; and a plurality of parties may constitute the delivery agent.

The distribution rights holder 1 may be a party who has obtained from content producers the right to distribute content (i.e., digital data). For example, a content producer may be the distribution rights holder; or the distribution rights holder may be a joint venture involving content producers. The destinations include individuals and businesses (such as theater operators).

In the typical arrangement described below, an upstream system includes the operating system of the distribution rights holder system and the delivery system of the delivery agent; and a downstream system is constituted by a system of destinations. The digital data to be delivered includes character data (such as text, symbols and figures), audio data (such as voices and pieces of music), video data (such as still and moving pictures), audio-video composite data (such as movies and broadcast programs), program data, database data, and other digital data. Also included is attached information such as IDs known as meta-data (ID information on media), information relating to the date on which the data was generated (e.g. the date of shooting the picture), locations, people, and various conditions.

In FIG. 1, the digital data is delivered over a high-speed multipoint delivery network 3 suitable for delivering large quantities of data at high speed in a broadband environment. A content producer 1 sends digital data content to an electronic delivery operator 2 from which the content is delivered to specific destinations A, B, etc., over the high-speed multipoint delivery network 3. It is also contemplated to deliver the content on CD-ROMs, DVDs or other suitable storage media. The high-speed multipoint delivery network 3 is a broadband network which may include a broadcasting satellite, optic fibers and/or other resources. Such a network is capable of transmitting large quantities of data at least in the downward direction. Alternatively, the network may have bidirectional capabilities permitting mass data transmission in both the upward and the downward directions.

Figure 2:
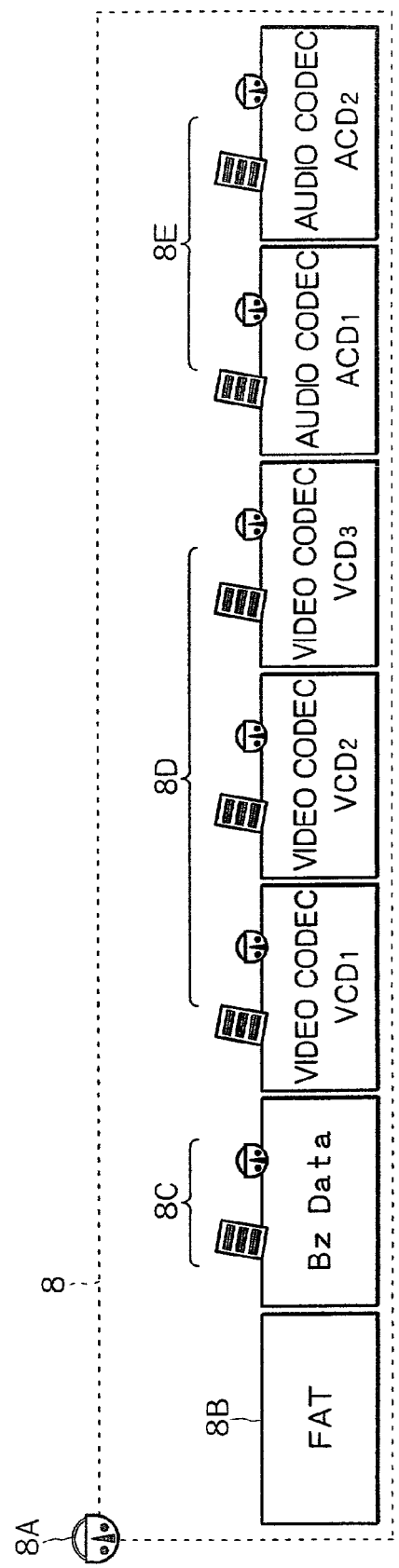
FIG. 2 depicts the data structure of digital data delivered by the delivery system in accordance with this invention.

The high-speed delivery network 3 carries data 8 whose structure typically is of the type shown in FIG. 2. FIG. 2 illustrates the use of a key 8A to indicate that a network provider (not necessarily the delivery agent) reinforces the secrecy of the communication service it provides by use of its own encryption key to encrypt, or lock, the data it delivers. This encryption key may or may not be used depending on various circumstances, such as the overall security of the data or of the delivery system, cost, affect on reception, etc. Nevertheless, it is expected that most network providers will encrypt data over the networks they operate, especially since this portrays the business operator to be more secure than any other candidates. Although not shown in FIG. 2, in practice a header is provided with the data 8.

The portion enclosed by broken lines in FIG. 2 corresponds to the data delivered by the delivery agent (also referred to as the delivery business operator) 2. In the illustrated example, the data contains a file allocation table (FAT) 8B indicating data or file storage information, operation data 8C including digital data usage conditions (destinations, duration of reproduction allowed at each destination, number of reproduction cycles permitted, and the like), video data 8D, and audio data 8E.

The illustration of locks associated with respective data items shows that the different data items are each protected by encryption processes performed by the distribution rights holder or the delivery business operator (singly or both of them working in cooperation). The encryption key used here is generally common to all data items. Alternatively, different encryption keys may be adopted for different data types (e.g., for different sets of video data). As another alternative, a different encryption key may be used to encrypt each of the respective data items regardless of the data type.

As depicted in FIG. 2, a given content is delivered in multiple formats. That is, a single content (such as a movie or a video program) is delivered by using a plurality of types of coding and decoding video and audio data (i.e. different codec methods). In the example of FIG. 2, video content is delivered in three video data types using three different codec methods. Typical codec methods include MPEG (Moving Picture Experts Group) standards, wavelet transformation and others.

Using different coding methods for delivering a video content confers higher degrees of freedom on the system configuration at destinations receiving the delivered content. This means the user at each destination may continue to use his existing system without having to adopt an unfamiliar codec system dedicated to the digital data delivery service in question. Such a multiple format delivery scheme benefits the delivery agents because they need not limit their customers to specific destinations possessing a particular system. The destinations also benefit from the scheme because they can utilize existing equipment thanks to the wide selectable range of coding to deliver the digital data.

The foregoing applies to the audio data 8E as well. The example of FIG. 2 shows two audio data items coded by two different codec methods. Typical codec methods that may be used include MPEG standards and others.

In the system of FIG. 1, the data that can be received by a household, indicated for example as destination A, is made up of a video data item coded by a video codec $VCD_1$ and an audio data item coded by an audio codec $ACD_1$. At this destination, these data items in the delivered data 8 are selectively extracted or reproduced on the basis of FAT. On the other hand, the data that can be received by a business operator, indicated for example as destination B is composed of a video data item coded by a video codec $VCD_2$ and an audio data item coded by an audio codec $ACD_2$. At this destination B, these data items in the delivered data 8 are selectively extracted or reproduced on the basis of FAT. However, it is not necessary to deliver all data in multiple formats at all times; each destination may alternatively be supplied with data solely in the formats typically used by that destination.

The delivered digital data are decrypted at the destination by a decryption server 33, to be described later, before being output to an output device 34. The processes performed internally by the decryption server 33 and output device 34 will be described later. The delivery of encryption keys needed to decrypt the encrypted digital data provides conditional access to that data. In FIG. 1, there are two encryption key delivery routes: one is a wide area network (transmission medium) 4, and the other is a storage medium 5. FIG. 1 shows a typical delivery arrangement where at least two types of key information are needed to restore a common encryption key, with a portion of the key information delivered electronically over the wide area network 4 and the remaining key information delivered physically on the storage medium 5.

The wide area network 4 in the arrangement is assumed to be a typical transmission network capable of bidirectional communication, such as a public switched network (e.g., the Internet, an ATM network, a packet switched network or the like) or a leased line network. The storage medium 5 may be a magnetically readable medium, an optically readable medium, a semiconductor memory or the like. The storage medium may be delivered by postal service, by a home delivery service, or by other conventional delivery services.

It is assumed, for the purpose of the present description, that the encryption key used to encrypt digital data is common to all destinations and that a set of key information delivered individually to each destination is unique to that destination. When each destination is supplied with its own key information, the encryption key used to encrypt the digital data cannot be restored unless and until all of the key information sent to a specific destination is acquired. This makes it harder or more time-consuming to misappropriate all of the necessary key information. In addition, each digital data item may have its own set of key information.

The encryption key used to encrypt the digital data preferably should be specific to each content to be delivered. With this arrangement, even if all key information is misappropriated, resulting in the unauthorized restoring of digital data, the injury is limited only to the content encrypted by that specific key. Of course, it is not mandatory for the encryption key to be unique to each content; a common encryption key may be utilized for a plurality of contents. Nevertheless, the delivery system as a whole should have enhanced capabilities of security against unauthorized recovery of data; and the individual encryption keys should not be restricted by any particular rules. The degree of data security may vary depending on the content to be delivered as well as on the delivery agent's business policy.

The present invention envisages having key information conveyed by a plurality of different routes, such as a network and a storage medium, as shown in FIG. 1. The multiple delivery route approach is adopted because of the different characteristics thereof, as outlined below.

An advantage of using a network is that it permits immediate delivery of key information. A disadvantage of a network is the difficulty in verifying whether the key information has been misappropriated. One disadvantage of using storage media is that it takes time for each destination to acquire (i.e., receive) the delivered key information. An advantage of storage media is the relative ease to ascertain whether the key information has been misappropriated.

The present invention contemplates combinations of network-based and physical data delivery systems involving a storage medium. If there is little or no possibility of data being misappropriated on the network, all key information may be delivered over the network. If there is sufficient time between the delivery of key information and the delivery of content, (e.g., the content is delivered days after the key information is disseminated), all key information may be delivered using storage media.

The present invention also contemplates various encryption methods presently known as well as those techniques that will emerge in the future.

In FIG. 1, the key information delivered over two routes (wide area network 4 and storage medium 5) is generally constituted by a set of passkeys (partial keys) divided from the encryption key using a key division pattern specific to each destination. The set of passkeys alternatively may be formed by multiple keys generated specifically for each destination, with the encryption key being encrypted by the specific multiple keys and sent to the corresponding destination.

Figure 3:
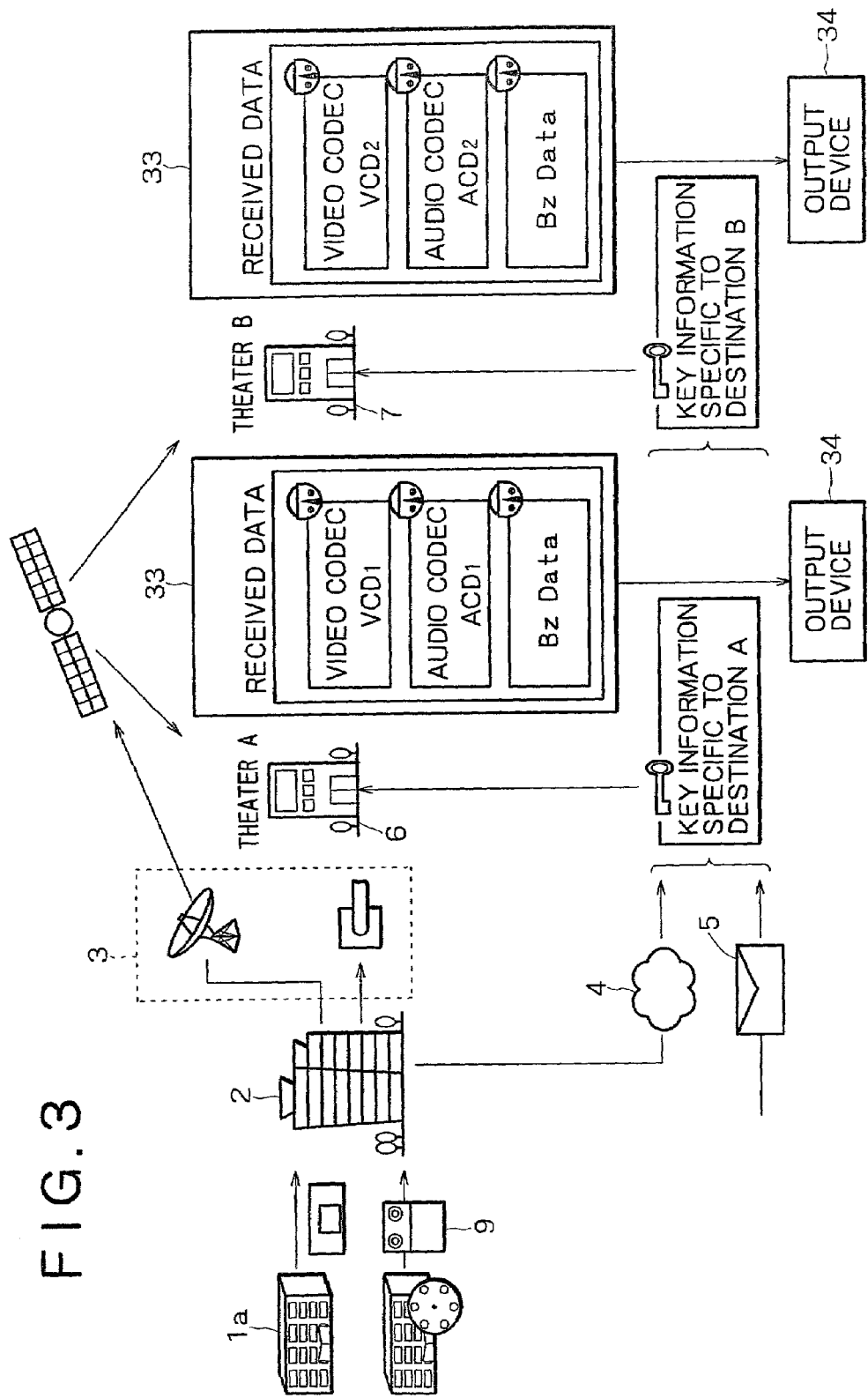
FIG. 3 is a schematic diagram indicating how the present invention is adapted for use as a movie content delivery system.

FIG. 3 shows a typical arrangement suited to deliver movie content electronically.

A movie production company 1*a* is used as the content producer 1 of FIG. 1, and theaters A and B receive digital data as the destinations 6 and 7 of FIG. 1. FIG. 3 includes film-to-video conversion (telecine processing) 9 that converts film images provided by the movie production company 1*a* into electronic images. Although not shown specifically in FIG. 3, theaters A and B may be of any scale such as large movie theaters, small single screen theaters or so-called cinema complexes.

Figure 4:
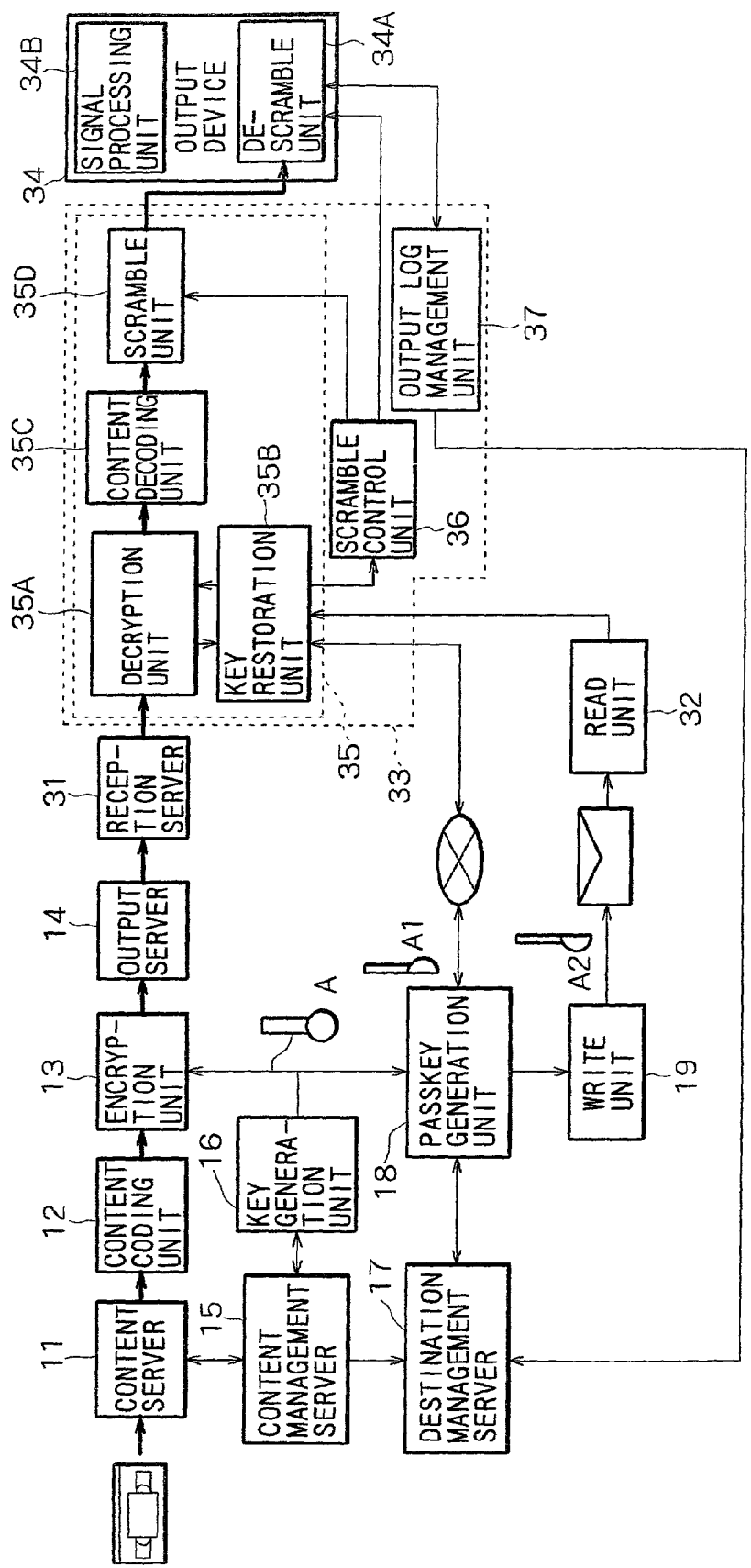
FIG. 4 is a block diagram of a first embodiment of a data delivery system embodying the invention.

FIG. 4 is an example of a delivery system having an upstream system made up of a content distribution rights holder 1 and an electronic delivery business operator 2; and a downstream system specific to each destination to which digital data is delivered. The upstream system generates an encryption key specific to each digital data item and encrypts the digital data using the corresponding encryption key. A set of passkeys unique to a respective specific destination is generated on the basis of the encryption key and a portion of the set of passkeys (or passkey information from which the set of passkeys may be produced) is delivered to the respective destination over a network. The rest of the set of passkeys (or passkey information) is written to a dedicated storage medium for physical delivery to the respective destination. The encrypted digital data is delivered to the destinations according to a delivery schedule (e.g. network broadcasting, pay-per-view movie, or the like).

The downstream system restores the encryption key specific to the corresponding digital data item, based both on the portion of the set of passkeys (or the passkey information) delivered over the network, and on the rest of the set of passkeys (or passkey information) delivered on the storage medium. The restored encryption key is used to decrypt the encrypted digital data.

In this example, the encryption key used to encrypt the digital data is divided, or parsed, by a division rule specific to each destination (i.e., each downstream system) into a set of passkeys. A portion of the set of passkeys thus generated is transmitted to the destination over a network, and the rest of the set is delivered physically on a storage medium.

A decryption server of the downstream system restores the encryption key specific to a digital data item based both on the portion of the set of passkeys (or passkey information) delivered over the network, and on the rest of the set of passkeys (or passkey information) delivered on the storage medium. The delivered digital data is decrypted using the restored encryption key. A locally generated scramble key is used to scramble the decrypted content; and a descramble key is generated if the digital data is properly produced. The decrypted data of interest is decoded and scrambled using the locally generated scramble key. The scrambled digital data from the decryption server is descrambled by using the descramble key furnished by the decryption server; and the descrambled digital data is output in a predetermined output format. In short, the decrypted digital data is scrambled before being output.

The scramble and descramble keys generated by the decryption server may be the same for an entire batch of digital data or may be different for each digital data item. The latter arrangement is preferred as a more effective countermeasure against possible data misappropriation.

The output device to which the scrambled digital data is supplied may be a display device (e.g., a monitor device, a TV set, a projector unit, a portable electronic apparatus), a printer, a speaker, a drive for recording data on a storage medium or the like. If the digital data is video data, it may be displayed on a display screen or projected onto a projection screen. If the digital data is audio data, it may be reproduced through speakers. If the digital data is audio-video composite data, it may be output in the two different formats (i.e., audio and video formats) simultaneously.

In the arrangement of FIG. 4, the upstream system includes a content server 11, a content coding unit 12, an encryption unit 13, an output server 14, a content management server 15, a key generation unit 16, a destination management server 17, a passkey generation unit 18, and a write unit 19. The downstream system includes a reception server 31, a read unit 32, a decryption server 33, and an output device 34 (with a descramble unit 34A). The decryption server 33 is further made up of a decryption section 35 (including a decryption unit 35A, a key restoration unit 35B, a content decoding unit 35C and a scramble unit 35D), a scramble control unit 36, and an output log management unit 37.

The aforementioned components may be implemented in the form of dedicated hardware or software.

In FIG. 4, thick lines denote transmission channels of large capacities, and thin lines represent transmission channels of relatively smaller capacities. It should be noted that this configuration represents the current state of the art so that the envisaged transmission capacities are relative in magnitude. At present, the passkey delivery routes indicated by thin line arrows may alternatively be arranged to have large transmission capacities.

The content server 11 is a device whose main function is to store digital data that has been delivered over transmission channels or conveyed on a storage medium (e.g., magnetic tape in FIG. 4). The storage function is implemented by use of a mass storage device incorporated in the content server 11. Preferably, this server has a computer-based structure.

This content server is comprised of a processing unit for executing control and arithmetic functions, a storage device for storing data necessary for signal processing, an input device through which data, programs and commands are input from the outside, and an output device for outputting the results of such internal processing.

The content coding unit 12 subjects digital data to compression coding and other coding processes such as MPEG conversion, wavelet transformation and the like. Content coding unit 12 executes a plurality of coding processes that are typically used. Each digital data item is therefore coded by multiple codes. Watermark information preferably is embedded in the video and audio data transmitted from the content server 11 to the content coding unit 12. The content coding unit may be implemented by dedicated hardware or by computer software.

The encryption unit 13 receives, from the key generation unit 16, an encryption key specific to a content item, and encrypts that content item using the encryption key. The cryptosystem used here may be any of those known to those of ordinary skill in the art.

Illustratively, DES (Data Encryption Standard), FEAL (Fast Data Encipherment Algorithm) and other encryption processes are used. The encryption processes are effected individually on operation data and on content data. It may be noted that the encryption process of content data is carried out illustratively with regard to each data item coded by the content coding unit 12. The encryption unit may be implemented either by dedicated hardware or by software.

The output server 14 performs two major functions: to store in a storage device the digital data that is encrypted so that only those recipients at specific destinations may view or record the content upon eventual decryption, and to output the encrypted digital data over the high-speed delivery network 3 according to a delivery schedule. The output function is implemented by a transmission device exhibiting a broadband transmission facility and rate control.

At present, overnight storage data delivery is envisaged for delivery of data over the high-speed delivery network 3. In the future when higher transmission rates are expected to be prevalent, streaming delivery or the like may also be provided.

Where encrypted digital data is delivered on a storage medium, the output function is implemented by a drive that stores digital data on a suitable storage medium.

In communicating with the content server 11, the content management server 15 registers newly accepted content, searches for and retrieves desired content, divides files, and performs other processes. The content management server preferably is computer-based, and manages the encryption keys that are generated for each content item.

The key generation unit 16 generates an encryption key unique to each item of digital data to be delivered. The cryptosystem used to generate the encryption keys may be any of those known to those of ordinary skill in the art. That is, state-of-the-art encryption techniques are adopted to make unauthorized decryption of data difficult to accomplish.

Using a database, the destination management server 17 manages destinations, delivery conditions and other operational data for each digital data item, as well as the encryption key information generated for each destination. The delivery conditions include usable time periods, allowed output count (e.g., the number of times a content item may be recorded or reproduced) and the like. The destination management server preferably has a computer-based structure.

The destination management server 17 may be installed in one of three locations: in the system operated by the content distribution rights holder alone, in the system of the electronic delivery business operator alone, or in both systems. The option that is adopted depends on which party delivers key information to each destination. Of course, if a small number of business operators have knowledge of the key information, data security for the entire system improved.

The destination management server 17 is adapted to receive downstream system output log data over an up link (usually the Internet, a telephone line or like communication line). Using the output log, the destination management server manages output histories (dates and times of output, output counts, output periods, and such related information such as the presence of trouble, the number of content-wise viewers and target age groups, and the like) of the destinations (recipients). Accordingly, the destination management server 17 has a database and an output history management unit, neither shown.

The database and output history management unit may alternatively be furnished apart from the destination management server. Output log data may be totaled (or otherwise statistically processed) and analyzed either by the upstream system (which receives the output log reports) or by the downstream system (before the downstream system transmits the results of its processing to the upstream system).

When the output log of the downstream system is managed by the upstream system, the status of content distribution may be readily monitored. This arrangement also permits the acquisition of market developments such as box-office results, current fads and trends. Alternatively, log management may be assumed by a content output research firm or by an operator other than the digital data distribution rights holder or the electronic delivery business operator.

Output log data may be supplied to and utilized by a suitable electronic device in place of the distribution management server 17. The output log need not include all of the information mentioned above (dates and times of output, etc.). One or a desired combination of output log items may be reported instead. Also, output log data is optional and, if preferred, need not be used.

The passkey generation unit 18 divides an encryption key A, generated for each content item (e.g. for a movie, a video program, audio or the like) by a division pattern unique to each destination, thereby generating a set of passkeys A1 and A2. For example, if there are 1,000 recipients at as many destinations, 1,000 sets of passkeys A1 and A2 are generated. The passkeys thus generated are sent to the destination management server 17 as well as to an appropriate delivery processing unit. In this example, the passkey generation unit supplies a portion of the set of passkeys, namely the passkey A1, to a communication unit, not shown, for delivery over a network, and supplies the remaining passkeys, namely the passkey A2, to the write unit 19 for delivery on a storage medium.

The write unit writes the reported passkey A2 to a predetermined storage medium which may be a magnetically readable medium, an optically readable medium, a semiconductor memory or the like. Address information for delivery of the storage medium to the appropriate destination is supplied by the destination management server 17. Similarly, network addresses are supplied for delivery of the passkey A1 to the proper destination.

At the downstream system, the reception server 31 implements the functions of receiving the encrypted digital data which permits recipients only at specific destinations to view or record the content upon eventual decryption (i.e., encryption provides conditional access to the content); storing the delivered digital data in a storage device; and outputting the digital data to the decryption server 33 according to a predetermined reproduction schedule. In addition, error correction of the received data also is performed.

Where the digital data is delivered on a storage medium, the reception server includes a read unit for reading the delivered digital data from the storage medium.

Read unit 32 in the downstream system functions to read the passkey A2 from the storage medium on which it is conveyed. Although not shown in FIG. 4, a communication unit is provided to receive the passkey A1 delivered over the wide area network.

The decryption server 33 decrypts the encrypted digital data, and decodes the decrypted but still coded digital data. The decryption server also locally scrambles the decoded data to prevent the restored original data from being output in an unprotected form. The decryption server may be implemented either by dedicated hardware or by software. To protect the digital data from misappropriation, the decryption server 33 is provided in a secure physical housing that may be opened, or unlocked, only if authorized procedures are followed.

The decryption section 35, which includes decryption unit 35A, key restoration unit 35B, content decoding unit 35C and scramble unit 35D, is provided with effective countermeasures against misappropriation of data. This is because important information, namely, the encryption key information and the original digital data flows between the function blocks comprising the section. For that reason, functional blocks of the decryption section are formed as semiconductor integrated circuits or are structured to have their functions disabled if the housing of section 35 is forcibly opened.

The decryption unit 35A uses the encryption key furnished by the key restoration unit 35B to decrypt the digital data supplied from the reception server 31, thereby providing conditional access to the digital data. The decryption unit may be implemented either by dedicated hardware or by software.

The key restoration unit 35B uses both the passkey A1 delivered over the network and the passkey A2 delivered on a storage medium to restore the encryption key for decrypting the encrypted digital data. The restored encryption key is retained for a predetermined period of time as by being stored on a suitable storage medium such as a nonvolatile memory or hard disk.

Before decrypting the digital data supplied from the reception server 31, the key restoration unit 35B reads operation data 8C attached to the digital data (see FIG. 2) to determine if the reproduction conditions (usage conditions) set by the operation data are satisfied at that time. If the reproduction conditions are satisfied, the key restoration unit sends a decryption enable signal to the decryption unit 35A and a scramble key generation signal or a scramble key output enable signal to the scramble control unit 36. If the reproduction conditions are not satisfied, the key restoration unit 35B feeds inhibit signals to the decryption unit and to the scramble control unit.

The content decoding unit 35C is compatible with the codec processing used by the recipient at the particular destination. The content decoding unit may be implemented either by dedicated hardware or by software and is adapted to restore the original unencrypted digital data.

The scramble unit 35D functions to scramble the decrypted, decoded digital data to impart further protection to the original data that will be output. The scramble unit may be implemented either by dedicated hardware or by software.

In the example illustrated in FIG. 4, the scramble control unit 36 is shown outside the decryption section 35, but it will be recognized that, if desired the scramble control unit may be incorporated in the decryption section.

When the scramble control unit 36 is enabled by the key restoration unit, it generates a scramble key and a descramble key paired therewith. The scramble key and paired descramble key may always be the same set of keys regardless of the delivered content (i.e., a fixed pair of scramble and descramble keys may be output from storage). Alternatively, a different set of scramble/descramble keys may be generated for each content (i.e., a different pair of scramble and descramble keys may be generated every time a new content item is output, the set of scramble/descramble keys being retained while predetermined reproduction conditions are satisfied). As a further alternative, a different set of scramble/descramble keys may be generated upon each reproduction output (i.e., a different pair of scramble and descramble keys are generated every time a coded content is decoded).

If the scramble key information is arranged to be changed periodically or irregularly while a single content is being output, the scramble control unit 36 generates scramble and descramble keys at suitable intervals while the digital data is supplied to the output device 34.

If desired, scramble key generation status from the scramble control unit 36 may be reported to the output log management unit 37 to permit monitoring of whether the scramble keys are generated (i.e. misappropriated) without proper authorization.

The output log management unit 37 manages the output log of the output device 34 in order to determine if there is any unauthorized output from that device. The output log management unit may be implemented either by dedicated hardware or by software. Log data from the output log management unit is supplied over communication lines to the destination management server 17 of the upstream system. This allows the upstream system separately to monitor the reproduction output status of the recipient at any particular location, and to check for any unauthorized handling of data.

The output log data may be original or raw data, or data that has been totaled (or otherwise statistically processed) and analyzed by the output log management unit or by other units. The output log data may contain demographic information such as the number of content-wise viewers, target age groups, and the like.

The output device 34 is compatible with the recovered digital data. For example, if the digital data is video data, the output device 34 may be a display unit or a projection unit.

If the digital data is audio data, the output device may be a speaker. In any case, the output device includes a descramble unit 34A and a signal processing unit 34B that implements the basic function of the device.

The descramble unit 34A descrambles the scrambled digital data supplied by the decryption server 33. The descramble unit may be implemented either by dedicated hardware or by software. In practice, the descramble unit may be constituted by a semiconductor integrated circuit or a circuit board module.

The signal processing unit 34B outputs descrambled digital data in a suitable output format. If the output device 34 is a display unit or a printer, then images may be output in a frame or field format. If the output device is a speaker, the output from the descramble unit may be a real time-based acoustic reproduction.

Since the signals output by the descramble unit 34A are protected by static features such as electronic watermarking, it is preferable to house the output device 34 in a housing that can be opened only if authorized procedures are followed, and that disables the device if the housing is opened by force.

When new digital data are supplied to the content server 11, the content in question is uncoded with a unique encryption key under the control of content management server 15. The encryption key is supplied to passkey generation unit 18 which divides (or parses) the encryption key by a division pattern unique to the destination in question. The division pattern may be the same regardless of the varying contents delivered, or may be different for each content. In the example shown in FIG. 4, the set of passkeys formed by passkey information A1 and A2 is generated in a manner unique to each content for each destination.

The generated passkeys A1 and A2 are delivered to the desired destination prior to the transmission of digital data. For the system shown in FIG. 4, the passkey A1 is delivered over the network and the passkey A2 is conveyed on the storage medium. Alternatively, the passkeys may be delivered after the delivery of digital data.

The downstream system reads the digital data (i.e., the content) according to a predetermined schedule and decrypts the encrypted digital data using the restored encryption key. It is appreciated that the decrypted digital data compatible with the codec used at the destination in question thus is selectively decoded. The decoded data is scrambled by the decryption server 33.

The decryption server feeds the scrambled digital data to the output device 34 which descrambles the received data using the descramble key supplied by the scramble control unit 36. The descrambled content is output in a desired format. The status of the content output is reported as output log data from the output log management unit 37 to the upstream system.

The output log data may be reported when each content is output (i.e., one log data report may be sent when a content item is output), or may be reported following a number of content outputs (e.g., an output status list may be output at the end of the day).

As described, there are a plurality of passkey delivery routes in the system of FIG. 4. In this arrangement, if the passkey (for example, passkey A1) delivered over one of the routes is misappropriated, the encryption key nevertheless is protected unless and until the remaining passkey (passkey A2) is misappropriated as well. Where passkey information is conveyed over a route different from the digital data delivery route (this includes the use of the same transmission medium but for the delivery of content at a different time from the delivery of the passkeys), then even if a portion of the passkey information and the encrypted digital data are misappropriated, the original digital data will not be recovered because the key information necessary for restoring the encryption key is delivered separately from the digital data.

Since the decrypted digital data is scrambled before being sent to the output device, the output device may be separate and apart from the server that performs the decryption function while maintaining sufficient protection against misappropriation of data.

If a more secure cryptosystem subsequently becomes available, or if it is preferred to adopt a different codec technique, this can be attained simply by replacing the decryption server 33. Regardless of the codec used at any destination, all data sent from the decryption server to the output device 34 are scrambled, so that the output device may be used by different types of codecs.

These features are conducive to reducing the costs in developing and manufacturing the output device 34. Hence, the existing output device may be easily replaced by another output device of higher performance, e.g., one with higher playback resolution, which may become available after system implementation.

Figure 5:
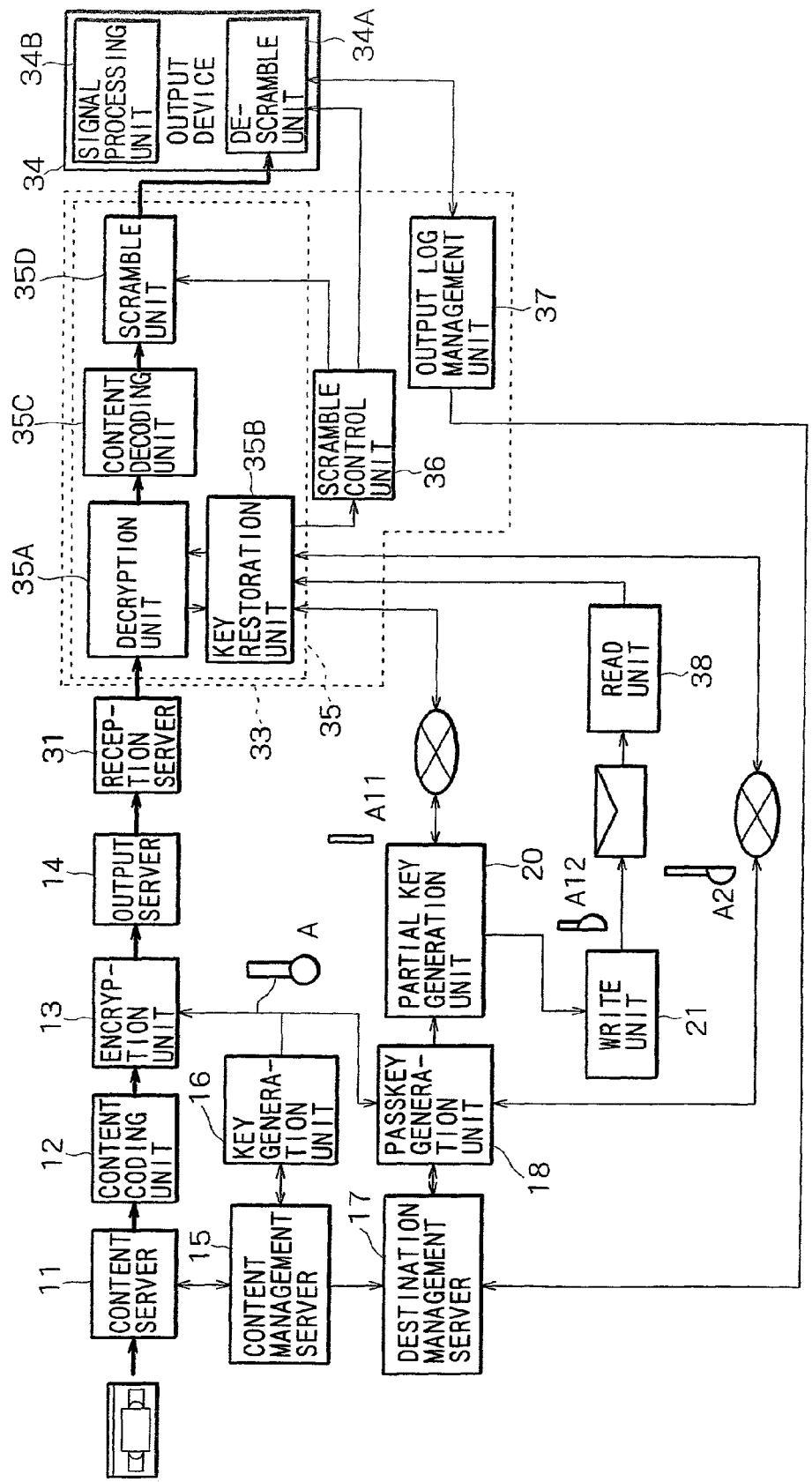
FIG. 5 is a block diagram of another embodiment of a data delivery system embodying the invention.

FIG. 5 illustrates another example of a delivery system wherein the same reference numerals are used to identify the same components shown in FIG. 4. The downstream system shown in FIG. 5 is identical to that shown in FIG. 4.

The delivery system shown in FIG. 5 differs from that in FIG. 4 in that a partial key generation unit 20 is provided for further dividing the passkey A1 generated by the passkey generation unit 18 into partial keys A11 and A12. In addition, a write unit 21 is used for writing partial keys A12 to a storage medium and a read unit 38 reads the partial keys from the storage medium. The routing of key information delivery is partially modified to allow for the three sets of key information A11, A12 and A2 to be conveyed.

Partial key generation unit 20 generates the set of partial keys A11 and A12 by dividing a portion of the passkeys (i.e. passkey A1) generated by the passkey generation unit 18 by a predetermined division pattern specific to each destination. Alternatively, the partial keys A11 and A12 may be generated from passkey information, which is information from which the passkeys may be reconstructed, or reproduced. Illustratively, if there are 1,000 recipients at, for example, 1,000 destinations, 1,000 sets of partial keys A11 and A12 are generated. The division pattern need not be unique to each destination; rather, it may be common to all destinations or it may vary depending on the geographical area or the group of destinations being handled by the system.

The partial keys thus generated are sent from the partial key generation unit 20 to the destination management server 17 as well as to an appropriate delivery processing unit. In the illustrated example, the partial key generation unit supplies the partial key A11 to a communication unit, not shown, for delivery over a network, and supplies the remaining partial key A12 to the write unit 21 for delivery on a storage medium. Write unit 21 may be similar to aforedescribed write unit 19 of FIG. 4. Alternatively, in place of partial key A11, and/or in place of partial key A12, partial key information may be delivered, from which the partial key A11 or A12 may be reconstructed, or reproduced.

In the delivery system shown in FIG. 4, the passkey A2 is conveyed to the downstream system by means of the storage medium. By contrast, the delivery system shown in FIG. 5 delivers the passkey A2 over the network. Operations other than the delivery of key information are carried out by the delivery system of FIG. 5 in the same manner as the delivery system of FIG. 4 In FIG. 5, key information is delivered over two transmission networks (either over two different networks or over the same network but at different times) and by means of a storage medium. Since there are more key information delivery routes, it is more difficult to misappropriate data over the delivery routes.

Figure 6:
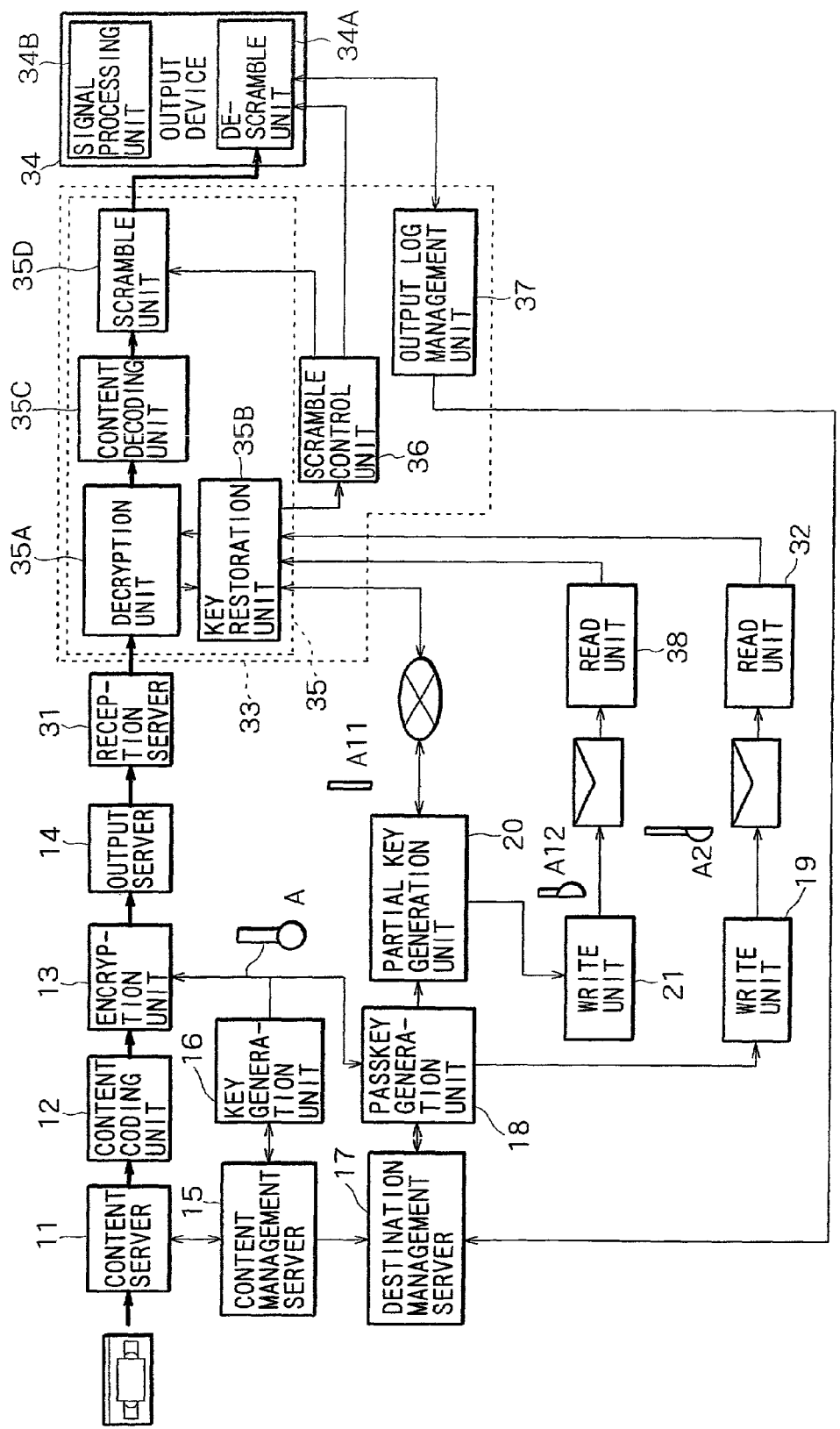
FIG. 6 is a block diagram of a further embodiment of a data delivery system embodying the invention.

FIG. 6 illustrates another example of a delivery system wherein the same reference numerals are used to identify the same components shown in FIGS. 4 and 5.

The delivery system shown in FIG. 6 differs from that shown in FIG. 5 in that the passkey A2 is delivered not over a network but by means of a storage medium as in FIG. 4. Nevertheless, partial keys A11 and A12 are delivered over different routes shown, for example, as the network and a storage medium. Operations other than the delivery of key information are carried out by the delivery system of FIG. 6 in the same manner as the delivery system shown in FIGS. 4 and 5. In FIG. 6, key information is delivered over one transmission network and by means of two different storage media. Since more storage media are used for key information delivery, it is easier to detect misappropriation over the deliver routes, thus offering higher degrees of data security.

Figure 7:
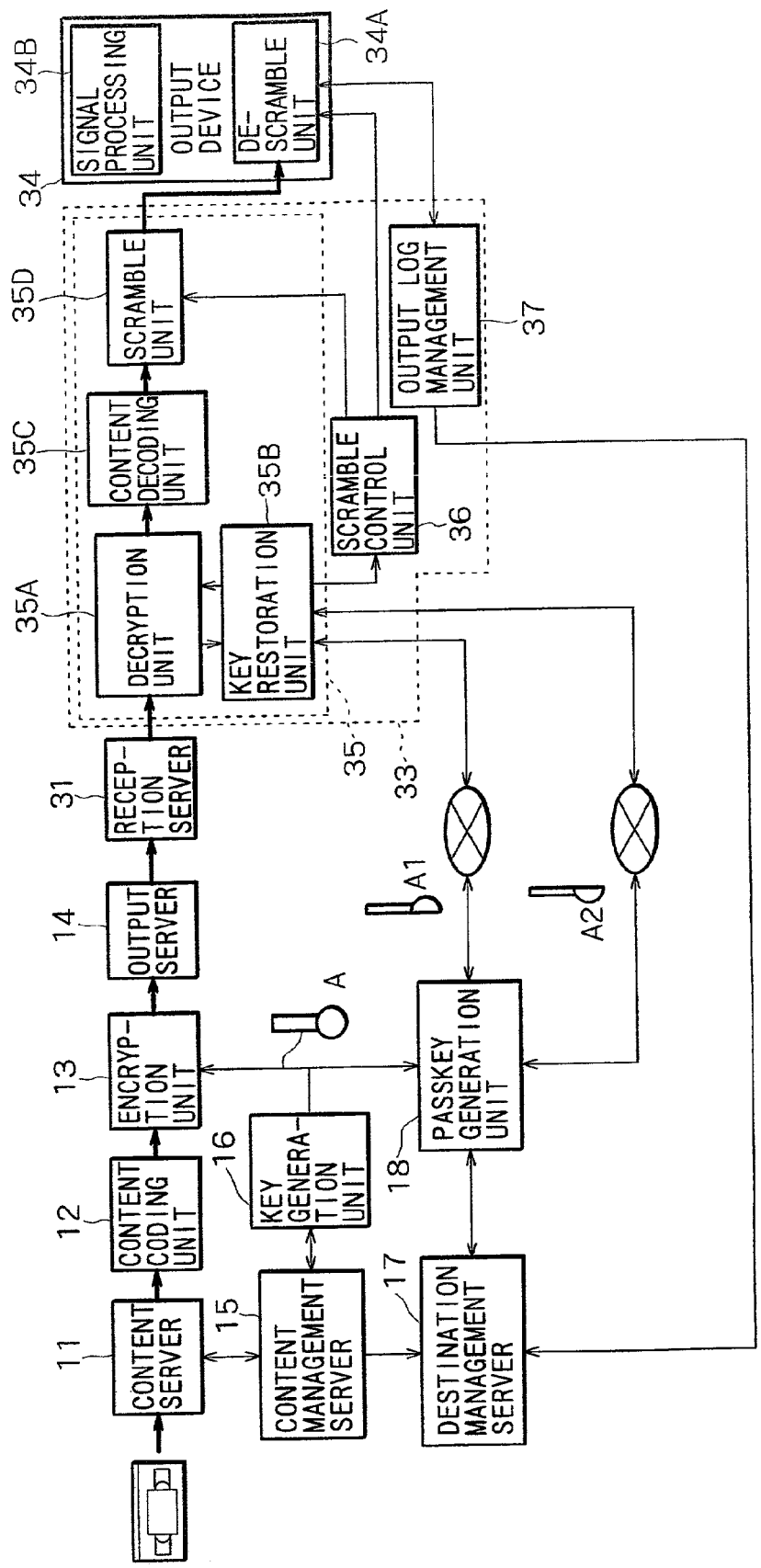
FIG. 7 is a block diagram of an additional embodiment of a data delivery system embodying the invention.

Referring to FIG. 7, there is shown another example of a delivery system in accordance with the present invention, wherein the same reference numerals are used to identify the same components shown in FIG. 4.

The delivery system shown in FIG. 7 differs from the aforedescribed examples in that the passkeys A1 and A2, or passkey information from which the passkeys A1 and A2 may be reconstructed, or reproduced, are both delivered over the networks. Operations other than the delivery of key information are carried out by the delivery system of FIG. 7 in the same manner as the delivery system shown in, for example, FIG. 4. Since key information is delivered over two transmission networks in FIG. 7, the time interval between the delivery of key information and the start of digital data delivery may be significantly reduced, compared with those arrangements where key information is conveyed by means of storage media.

Figure 8:
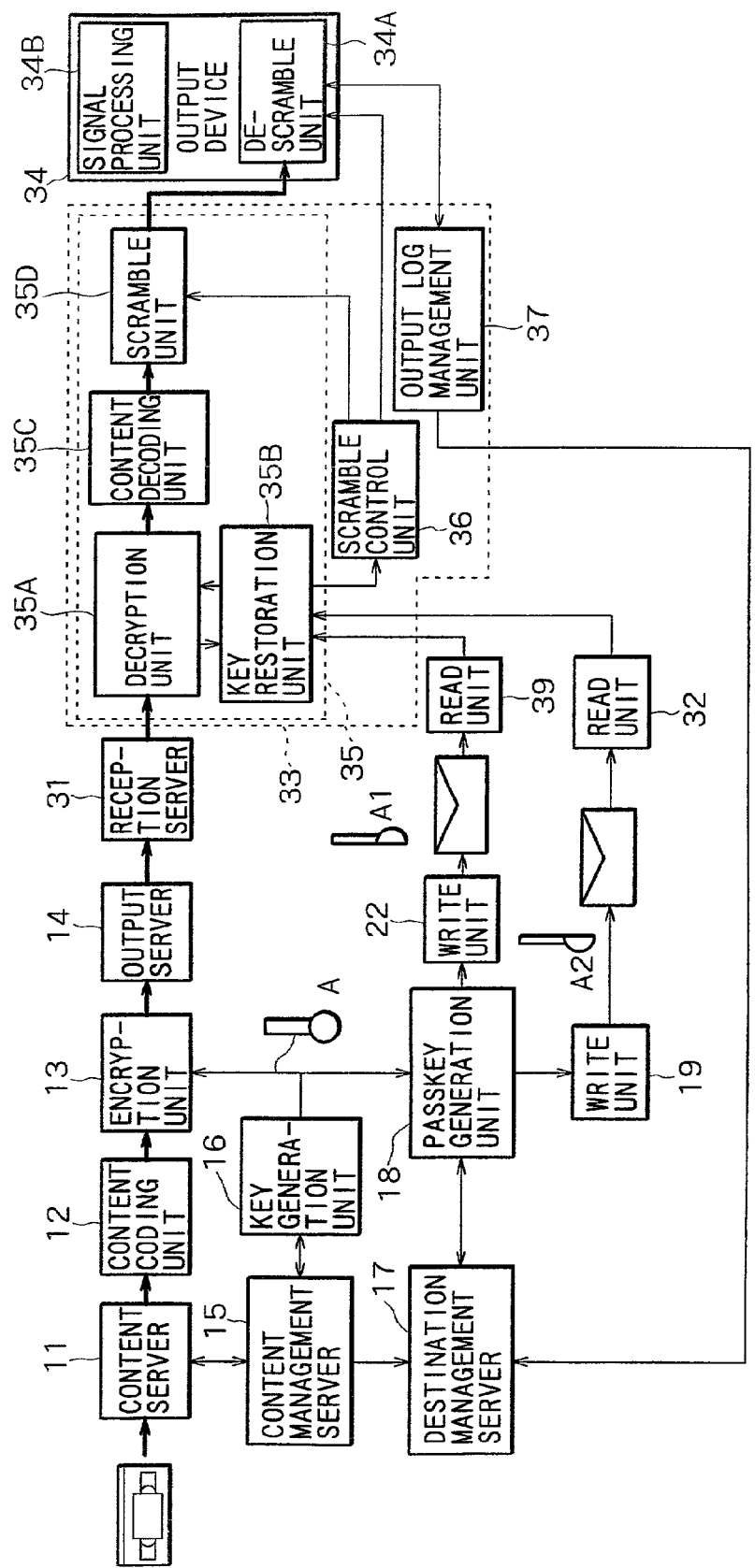
FIG. 8 is a block diagram of yet another embodiment of a data delivery system embodying the invention.

Another example of a delivery system in accordance with the present invention is shown in FIG. 8, wherein the same reference numerals are used to identify the same components shown in FIG. 4.

The delivery system shown in FIG. 8 differs from that shown in FIG. 4 in that the passkeys A1 and A2 are both delivered by means of storage media. Alternatively, passkey information from which the passkey A1 and/or the passkey A2 may be reconstructed or reproduced, may be delivered by the storage media. Accordingly, write unit 22 and read unit 39 are provided for writing and reading the passkey A1 to a storage media. Operations other than the delivery of key information are carried out by the delivery system shown in FIG. 8 in the same manner as by the delivery system shown, for example, in FIG. 4.

Because all of the key information is conveyed on storage media, misappropriation thereof can be readily detected. Hence, this arrangement offers high degrees of data security compared with cases in which key information is delivered over a network.

Figure 9:
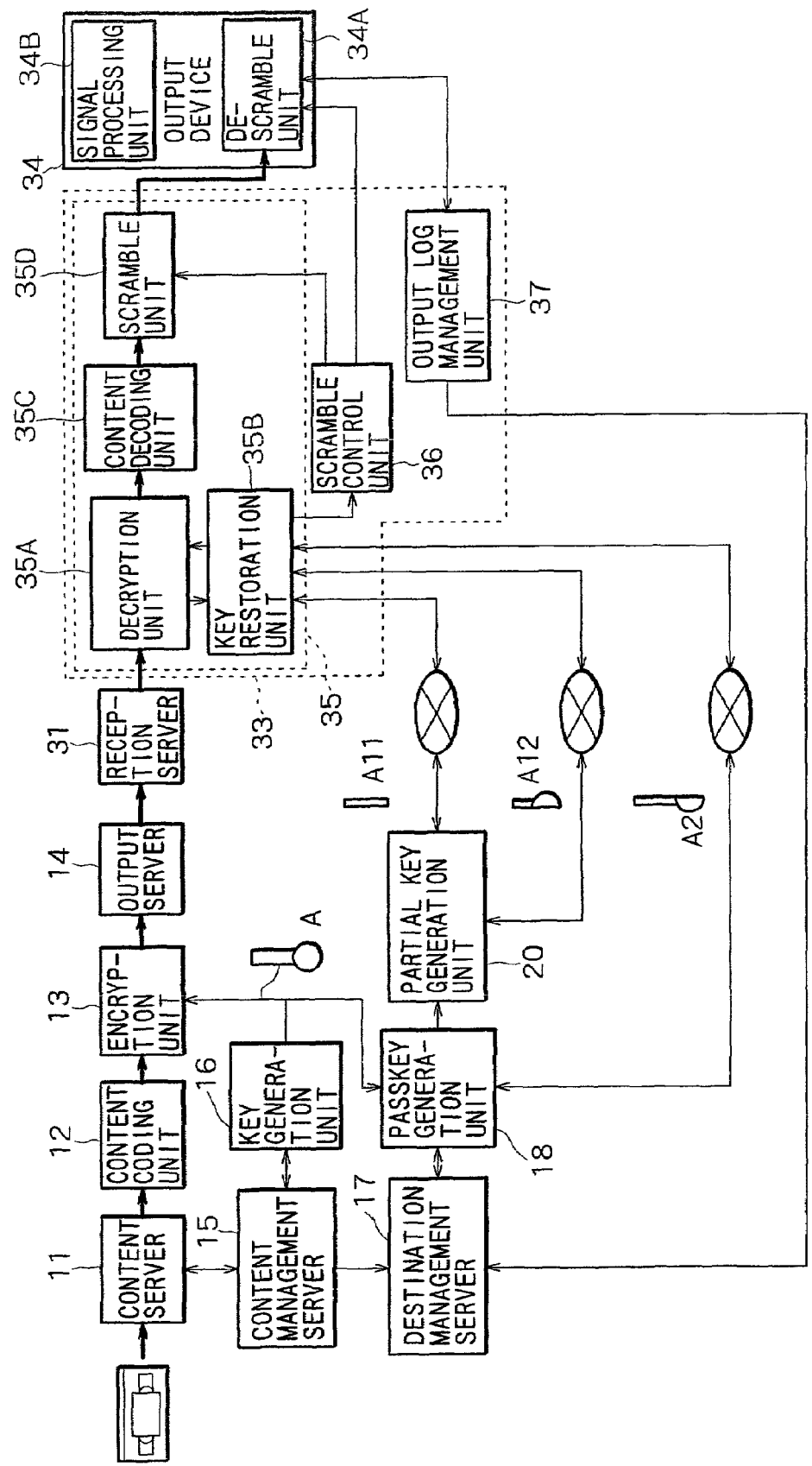
FIG. 9 is a block diagram of still another embodiment of a data delivery system embodying the invention.

A further example of a delivery system in accordance with the present invention is shown in FIG. 9, wherein the same reference numerals are used to identify the same components shown in FIG. 5.

The delivery system shown in FIG. 9 differs from that shown in FIG. 5 in that the partial key A12 generated by the partial key generation unit 20 is delivered not by means of a storage medium (as in FIG. 5) but over a transmission network. Operations other than the delivery of key information are carried out by the delivery system shown in FIG. 9 in the same manner as by the delivery system shown in FIG. 5.

Hence, since all of the key information is conveyed over networks having high speed transmission capabilities, the time interval between the delivery of key information and the start of digital data delivery may be substantially reduced as compared with those arrangements in which key information is conveyed by means of storage media. By delivering key information in the form of passkey A2 and partial keys A11 and A12, the delivery system ensures a higher degree of data security because unauthorized decrypting and recover of content requires the misappropriation of all of the passkey and partial key information.

Figure 10:
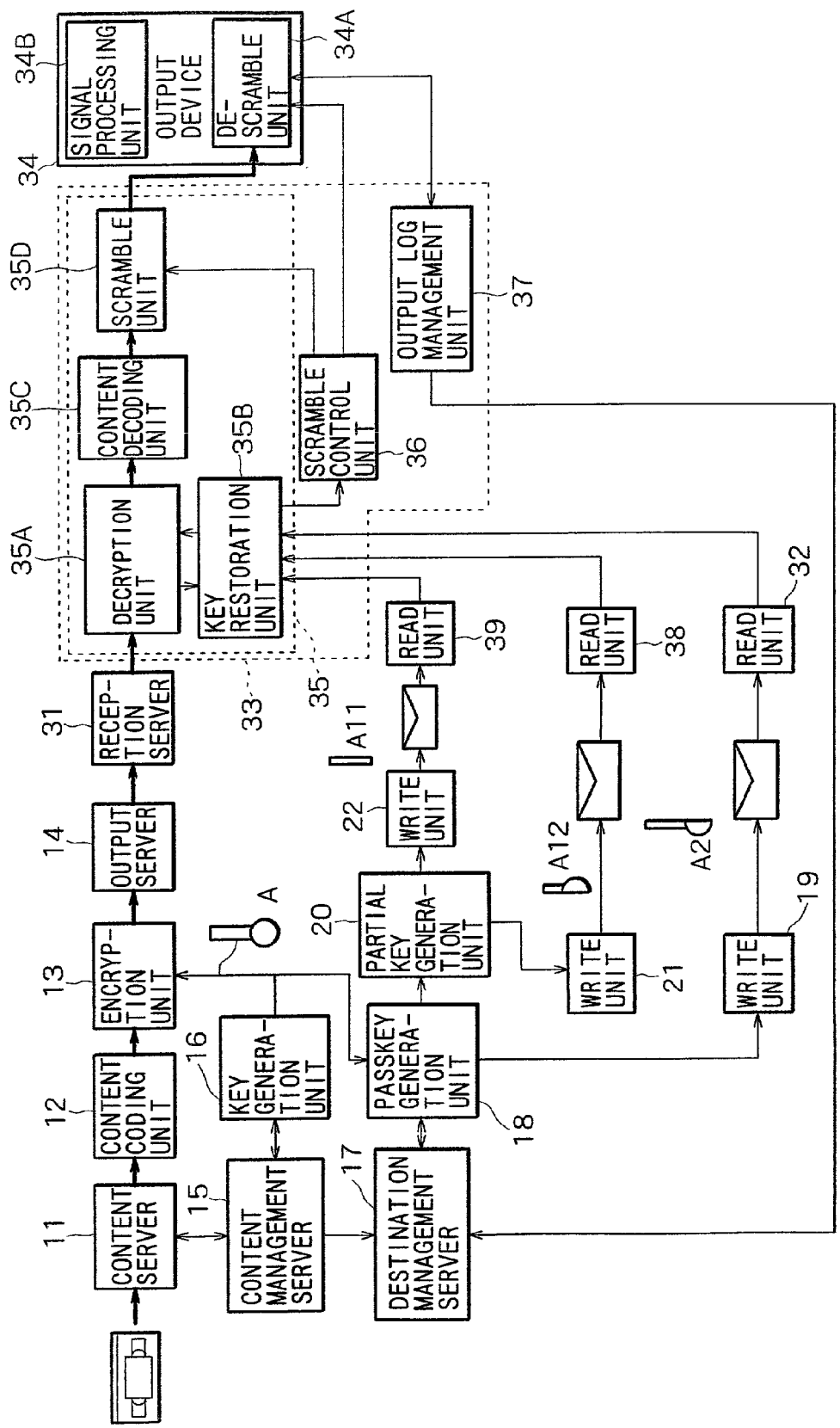
FIG. 10 is a block diagram of yet a further embodiment of a data delivery system embodying the invention.

FIG. 10 illustrates another example of a delivery system wherein like reference numerals identify like components shown in FIGS. 6 and 8.

The delivery system shown in FIG. 10 differs from the deliver system shown in FIG. 6 in that the partial keys A11 and A12 generated by the partial key generation unit 20 are both delivered by means of storage media. Accordingly, write unit 22 and read unit 39 are provided for writing the partial key A11 to and reading the partial key from a storage medium.

Since all of the key information is conveyed on storage media, misappropriation can be readily detected, resulting in a system that offers a high degree of data security.

Figure 11:
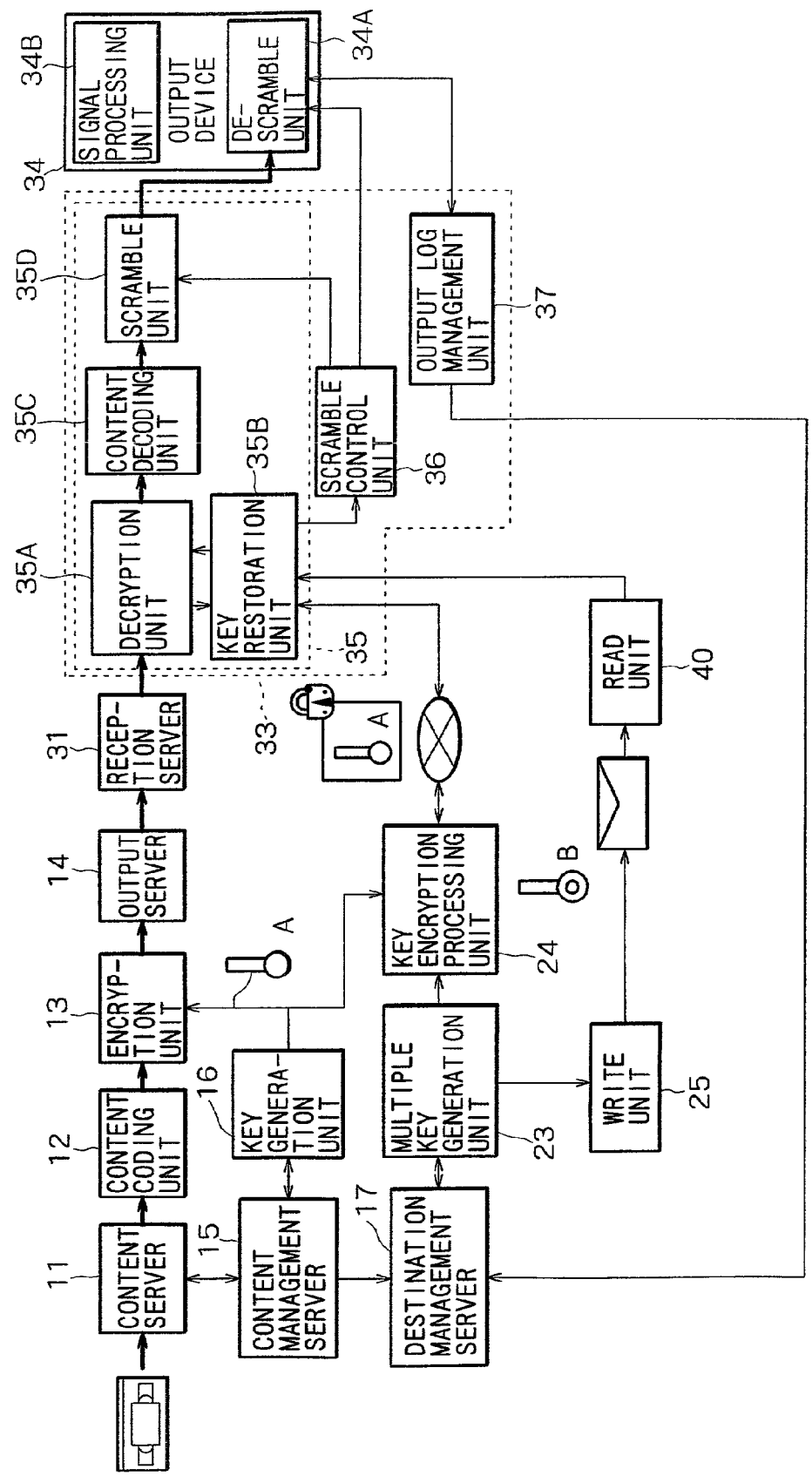
FIG. 11 is a block diagram of still an additional embodiment of a data delivery system embodying the invention.

Referring to FIG. 11, there is shown a further example of a delivery system in accordance with the present invention. As before, the same components shown in FIG. 4 are illustrated here with the same reference numerals. Here, the encryption key A used to encrypt the digital data is not divided into passkeys. Rather, the encryption key A itself is encrypted using multiple keys specific to respective destinations.

In the example shown in FIG. 11, a first encryption key A specific to each digital data item is used to encrypt the digital data. A second encryption key specific to respective specific destinations and to each digital data item is generated and used to encrypt either the first encryption key or key information from which the first encryption key may be recovered. The encrypted first encryption key (or key information) is delivered to each destination over a transmission network; while the second encryption key (or second key information from which the second encryption key may be reproduced) is delivered by way of a storage medium.

At the downstream system, the first encryption key specific to the corresponding digital data is restored by using either the second encryption key or the second encryption key information that has been delivered by means of the storage medium to decrypt either the encrypted first encryption key or the key information that was delivered over the transmission network. The restored first encryption key is used to decrypt the encrypted digital data.

The example shown in FIG. 11 differs from those examples described above in that this example has a multiple key generation unit 23 that generates multiple keys B specific to respective destinations. For instance, key B1 may be specific to a first destination, key B2 may be specific to a second destination, and so on. A key encryption processing unit 24 encrypts the encryption key A using the multiple keys B; and a write unit 25 writes the multiple keys B to a storage medium for delivery. A read unit 40, compatible with the write unit 25, reads the multiple keys B from the storage medium.

The multiple key generation unit 23 generates multiple keys B specific to each destination as well as to the encryption key A that is generated for each content.

Illustratively, if there are 1,000 recipients at 1,000 destinations, 1,000 sets of multiple keys B will be generated. The multiple keys B may or may not always be the same for a given destination. That is, different keys B may be generated depending on the content. Different keys B also may be generated depending on the geographical area or group of destinations being handled by the system.

The encryption key A that is encrypted by the multiple keys in key encryption processing unit 24 is delivered to the downstream system over the network.

In FIG. 4, the encryption key A specific to each content is divided by passkey generation unit 18 to generate sets of passkeys. In FIG. 11, the encryption key A is itself encrypted using the multiple keys B generated for each destination; and key A thus, encrypted, is delivered to the downstream system over a network. The multiple keys B are conveyed on a storage medium to the destination.

The example of FIG. 11 utilizes two kinds of keys: multiple keys B, and an encryption key A which is encrypted by the multiple keys B, delivered over multiple routes to the recipient at each destination. It is appreciated that even if one set of key information is misappropriated in transit, the encryption key information remains protected unless and until the other set of key information is misappropriated as well.

If the multiple keys B are found to be misappropriated or diverted in transit, the delivery of the encrypted encryption key A over the network is halted. Other multiple keys B are then issued and conveyed on another storage medium to the destination. This arrangement ensures a high degree of security against data misappropriation.

Figure 12:
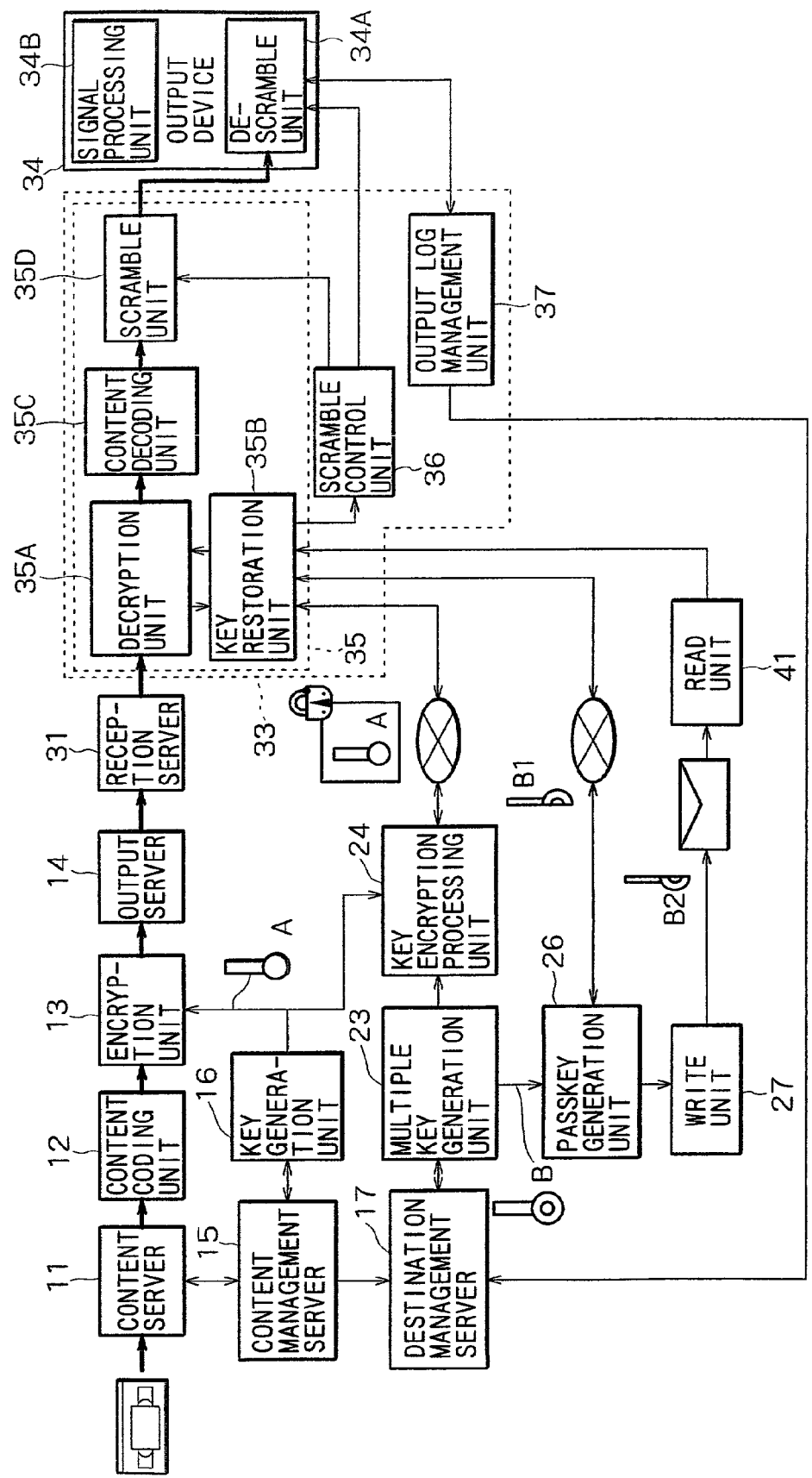
FIG. 12 is a block diagram of another embodiment of a data delivery system embodying the invention.

The example now described in conjunction with FIG. 12 divides the second encryption key B specific to a respective destination to generate a set of passkeys each set being specific to a respective destination. A portion of the set of passkeys (or passkey information from which the set of passkeys may be reproduced) is delivered to each destination over a second transmission network; while the remaining passkeys (or passkey information) are written to a storage medium for delivery.

At the downstream system, the second encryption key is restored by using both the portion of the set of passkeys delivered over the second transmission network and the remaining passkeys delivered on the storage medium. Once restored, the second encryption key is used to restore the first encryption key specific to the corresponding digital data; whereupon the encrypted digital data is decrypted by use of the restored first encryption key.

The system shown in FIG. 12 differs from that of FIG. 11 in that a passkey generation unit 26 is provided to generate a set of passkeys B1 and B2 by dividing the multiple keys B generated by the multiple key generation unit 23; and a portion of these passkeys (e.g., passkey B2) are written to a storage medium from which they subsequently are read (e.g., by a read unit 41).

Multiple keys B are specific to respective destinations, and a division pattern unique to a particular destination is used to generate a set of passkeys. If desired, the division pattern used by passkey generation unit 26 may be common to all destinations or may be assigned uniquely to each destination. Additionally, the division pattern may vary depending on the content or may be changed periodically or irregularly during content delivery. The division pattern may also vary depending on the geographical area or the group of destinations being handled by the system.

Because one passkey (e.g., B1) is delivered over a network and the other passkey (B2) is delivered on a storage medium, and because encryption key A itself is encrypted and delivered over a separate route, the system of FIG. 12 ensures a higher degree of security against misappropriation of content data.

Figure 13:
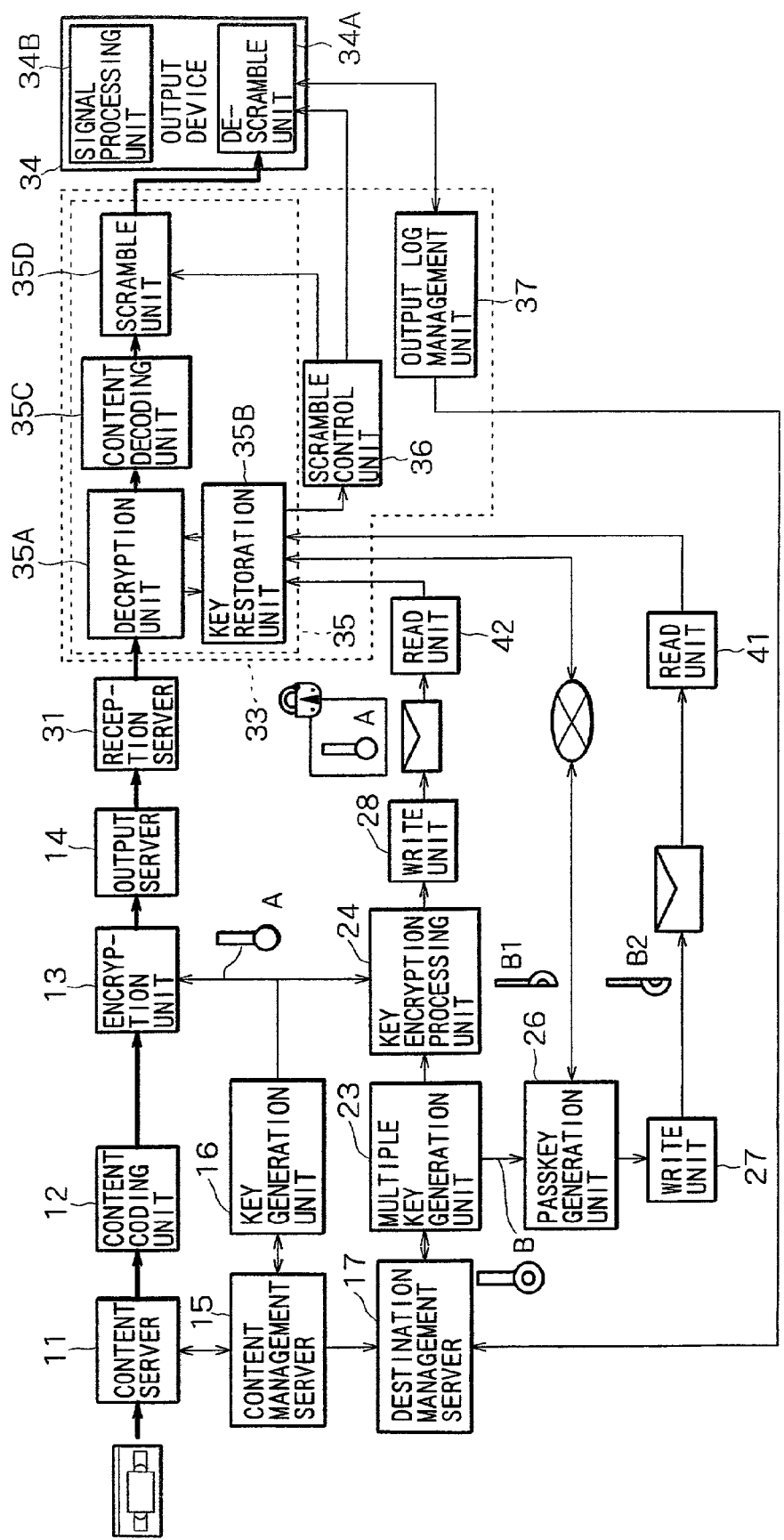
FIG. 13 is a block diagram of a further embodiment of a data delivery system embodying the invention.

A variation of the example described in FIG. 12 is illustrated in FIG. 13, where like components are identified by the same reference numerals.

In FIG. 13, the encrypted encryption key A generated by key encryption processing unit 24 is delivered not over a network but by means of a storage medium. Accordingly, a write unit 28 writes the encrypted encryption key A onto the storage medium from which it subsequently is read by read unit 42.

Since the encrypted encryption key A is delivered on a storage medium, misappropriation of key information may be discerned sooner than other arrangements in which the key information is conveyed over a network.

Figure 14:
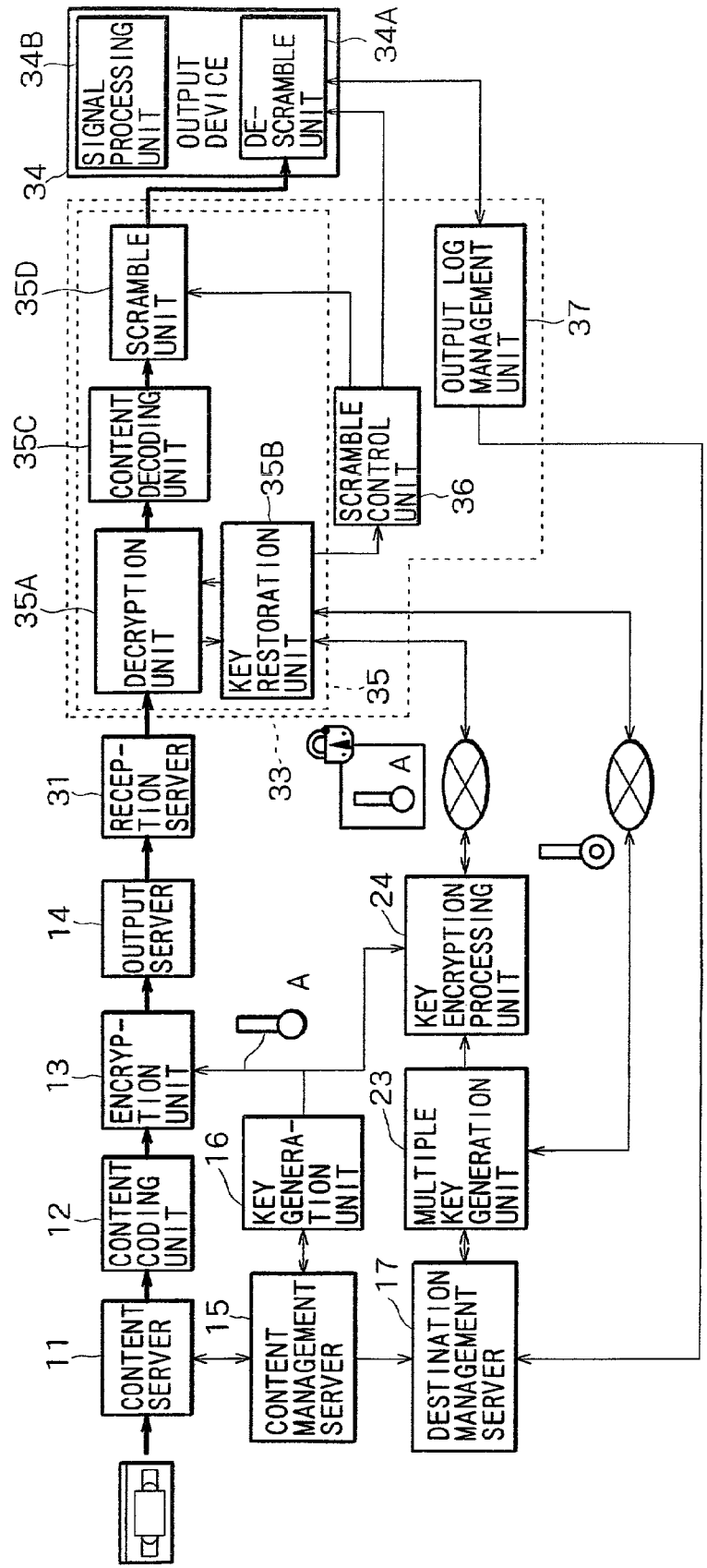
FIG. 14 is a block diagram of an additional embodiment of a data delivery system embodying the invention.

A modification to the example shown in FIG. 11 is depicted in FIG. 14, where like components are identified by the same reference numerals.

Here, the multiple keys B are delivered not by means of a storage medium (as in FIG. 11) but over transmission networks. Upon delivery of the multiple keys B, however, it is preferred to authenticate each destination by digital certification or other known techniques, and to encrypt the digital data by using a public key disclosed by the certified destination.

By delivering the multiple keys B over the network, the time period between key delivery and the start of digital data delivery is substantially reduced.

Figure 15:
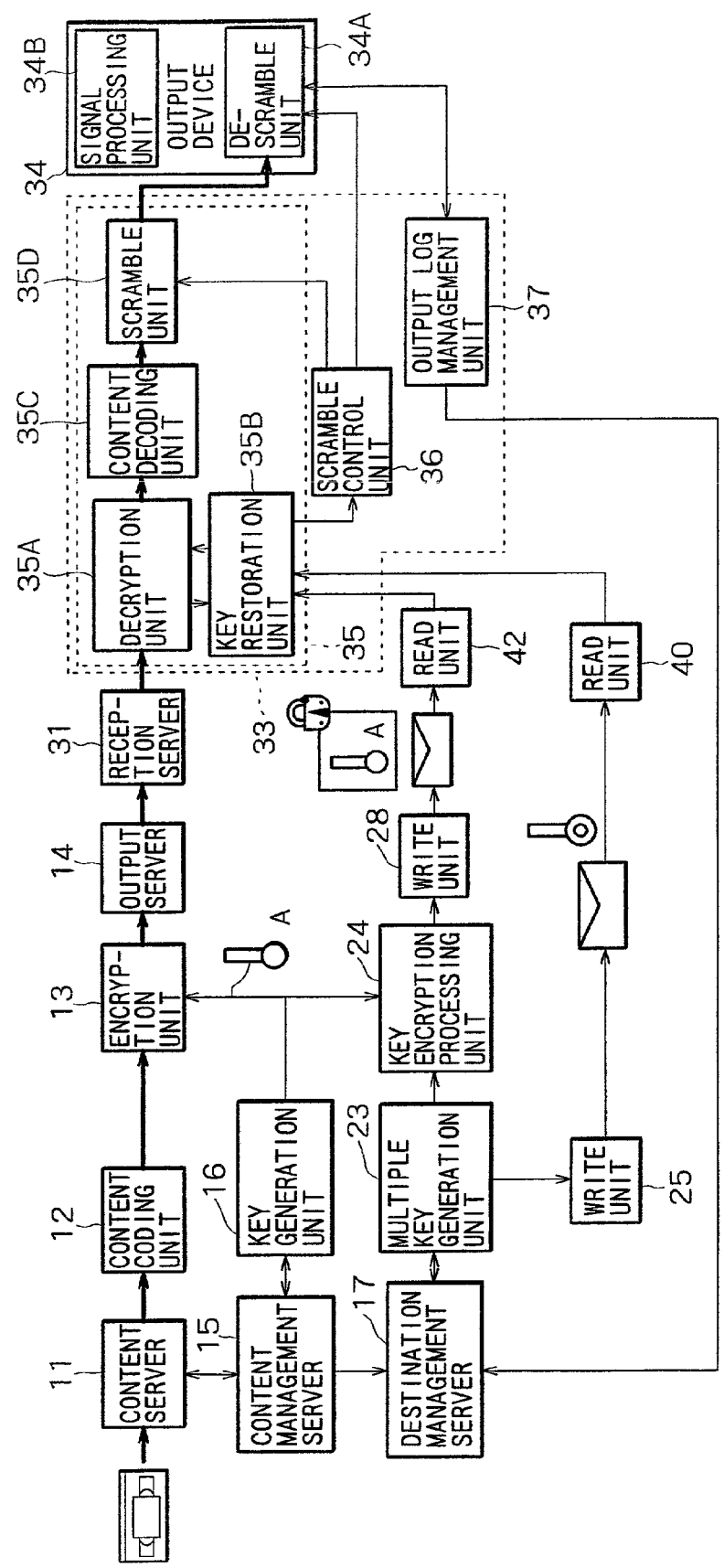
FIG. 15 is a block diagram of another embodiment of a data delivery system embodying the invention.

FIG. 15 illustrates another modification to the delivery system shown in FIG. 11.

In FIG. 15 the encrypted encryption key A is delivered not over a network (as in FIG. 11) but by means of a storage medium.

Since all key information (i.e., encrypted encryption key A and multiple keys B; or alternatively, encryption key information from which the respective keys may be reconstructed or reproduced) is conveyed on storage media, of which misappropriation can be readily detected, the data delivery system offers a high degree of data security.

Figure 16:
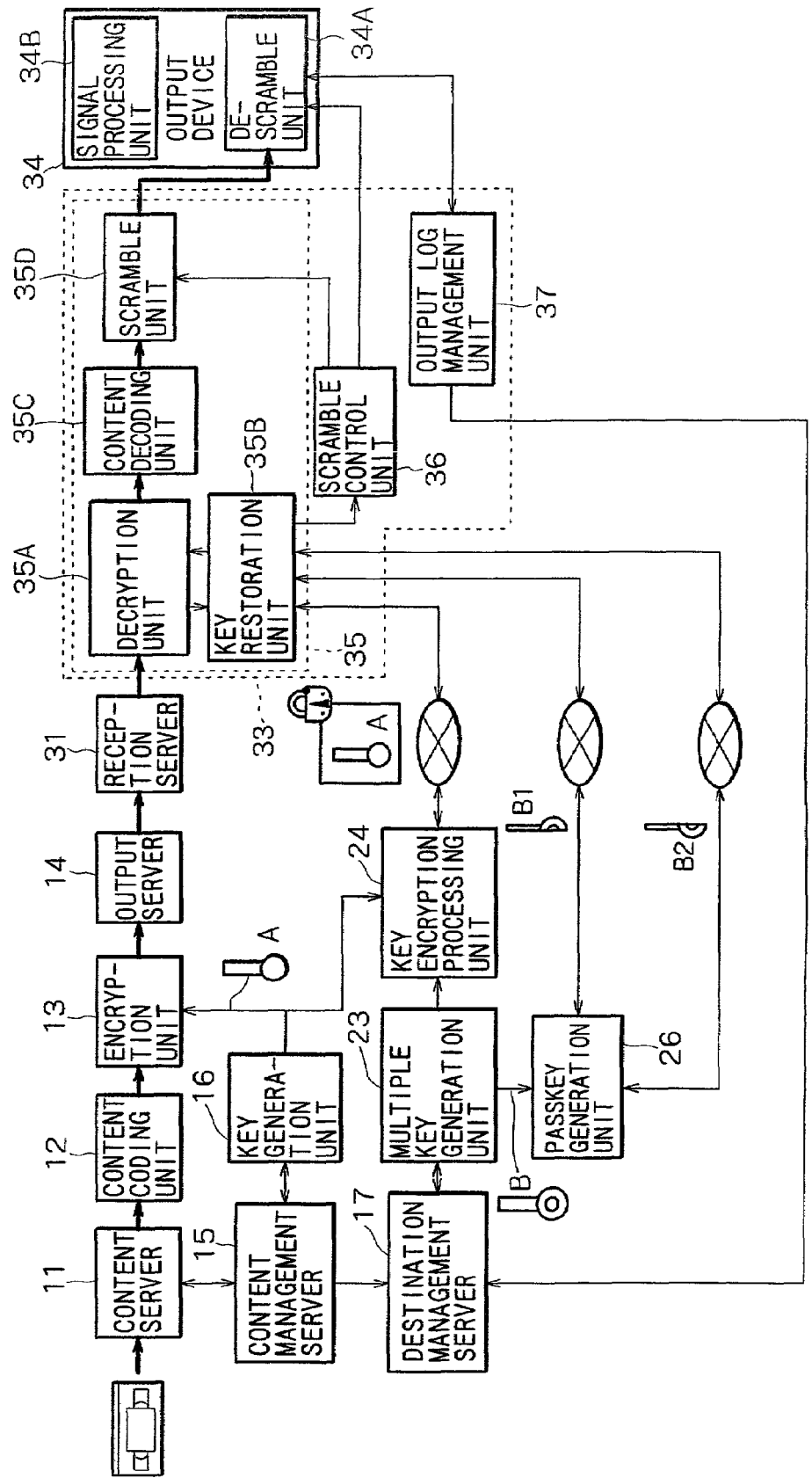
FIG. 16 is a block diagram of still another embodiment of a data delivery system embodying the invention.

Turning now to FIG. 16, there is illustrated a modification of the example shown in FIG. 12.

In FIG. 16, the passkey B2 generated (e.g., divided) from the multiple keys B is delivered not by means of a storage medium but over a network. Hence, all three sets of key information are delivered over networks. Accordingly, the time period between key delivery and the start of digital data delivery is significantly reduced. Nevertheless, because three sets of key information (A, B1 and B2) are delivered, there is a higher degree of security against data misappropriation of content data than other delivery systems in which two sets of key information are delivered over the network.

Figure 17:
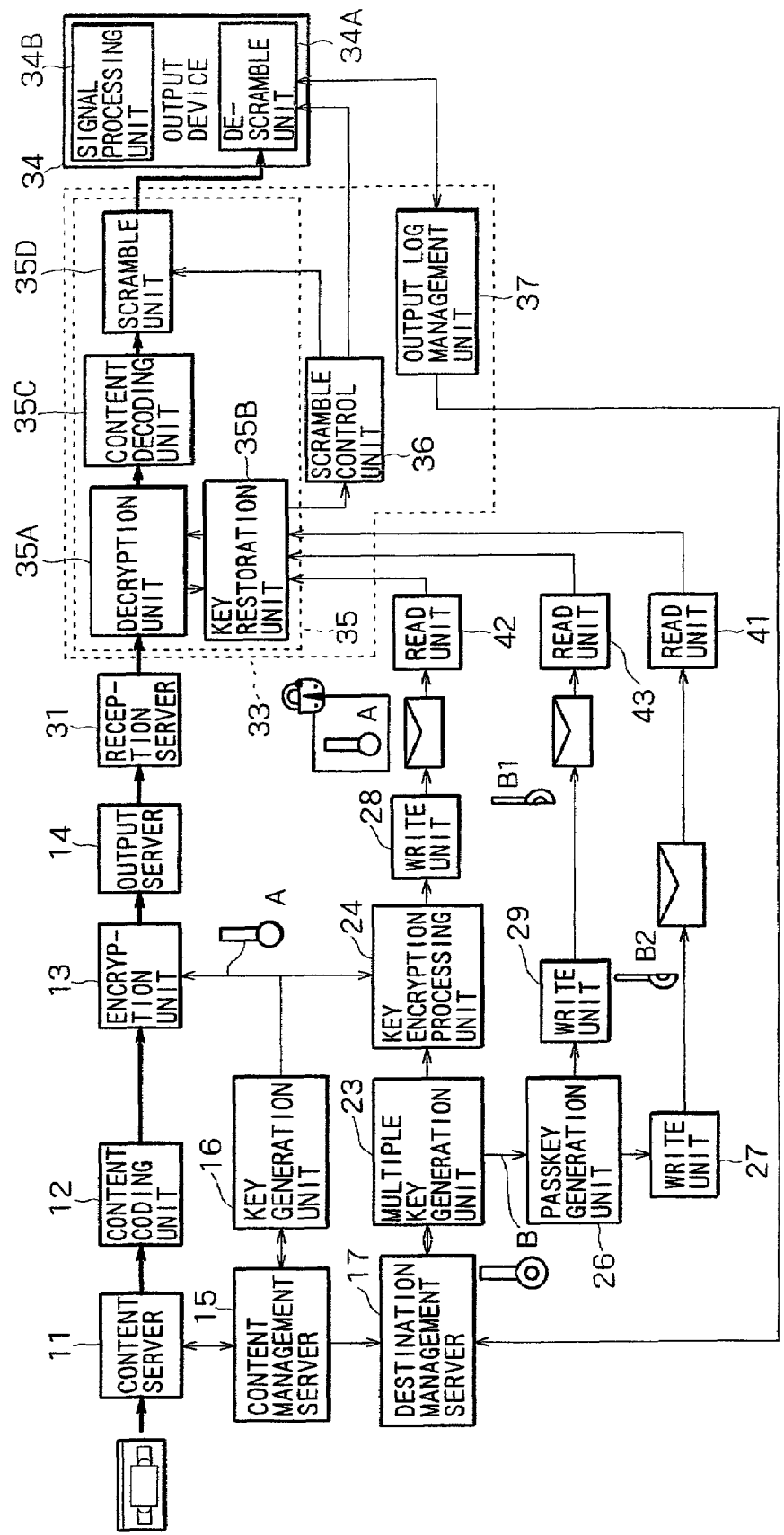
FIG. 17 is a block diagram of yet an additional embodiment of a data delivery system embodying the invention.

Referring to FIG. 17, there is illustrated a modification to the example shown in FIG. 13.

In FIG. 17, the passkey B1 generated from the multiple keys B (e.g., by a division pattern) is delivered not over a network but by means of a storage medium. Hence, in this example, all three sets of key information are delivered by storage media.

Because all key information is delivered by storage media, diversion or misappropriation of the keys can be readily detected. Accordingly, the illustrated system offers a high degree of security.

The foregoing description of the various examples of the inventive concept has not specified which of the illustrated functional units are operated by the distribution rights holder and which of these units are operated by the delivery business operator. FIG. 18 is a summary table of the degree of security that is expected when different parties carry out the function of content coding unit 12, the encryption unit 13 and the key generation unit 16 (which includes the passkey generation unit, the partial key generation unit and the multiple key generation unit). The arrangements contemplated by FIG. 18 use two sets of key information. If three or more sets of key information are used, the indication of "one key" in FIG. 18 will be understood to mean "at least one key."

A first arrangement, referred to as an operation platform, contemplates the assumption by the distribution rights holder of three roles: generating an encryption key A, coding the information content, and encrypting the coded content (i.e., content coding unit 12, encryption unit 13, and key generation unit 16 are all assumed to be operated by the distribution rights holder). It also is assumed that the distribution rights holder delivers the key information (see item 1 in FIG. 18).

If the distribution rights holder also operates the passkey generation unit 18 (including the partial key generation unit 20), the multiple key generation unit 23, and the key encryption processing unit 24 (including the passkey generation unit 26) and if the delivery business operator merely delivers encrypted digital data to specific destinations, then only the distribution rights holder is in a position to know the encryption key (master key) used to encrypt digital data. Hence, the distribution rights holder need not worry about the possibility that the encryption key will be misappropriated by or through the electronic delivery business operator. This operation platform thus assumes the distribution rights holder that the content which he offers is secure.

In another similar operation platform, (item 2 in FIG. 18), the key information is delivered by both the distribution rights holder and the electronic delivery business operator. If the delivery system shown in FIG. 5 is adopted, the distribution rights holder generates and distributes the passkey A2 while the electronic delivery business operator generates and delivers the partial keys A11 and A12 divided from the passkey A1 and delivers the partial keys thus generated. Likewise in the examples of FIGS. 6, 9 and 10, the passkey is generated and distributed by the distribution rights holder; and the partial keys are generated and delivered by the electronic delivery business operator.

In another arrangement, the electronic delivery business operator may write the generated passkeys or partial keys to storage media and deliver the storage media to their destinations, as in the examples depicted in FIGS. 4-6, 8, 10-14, 15 and 17 wherein key information is delivered on storage media. With this operation platform, the content distribution rights holder alone is in a position to know the encryption key (master key) used to encrypt the digital data.

As a variation of this operation platform, the distribution rights holder encrypts and delivers the encryption key A while the electronic delivery business operator generates and delivers the passkeys B1 and B2 delivered from multiple keys B. This variation, although offering a high degree of security nevertheless is somewhat lower in confidence.

A further similar operation platform, (item 3 in FIG. 18) assumes that key information is delivered by the electronic delivery business operator. When this operation platform is used in the example of FIG. 4, the distribution rights holder generates an encryption key while the electronic delivery business operator acquires that encryption key and produces the passkeys A1 and A2 therefrom.

In accordance with a different operation platform (see items 4-6 in FIG. 18), it is assumed that the electronic delivery business operator is responsible for encryption. In that case, the electronic delivery business operator acquires the encryption key from the distribution rights holder and encrypts the content accordingly. The coding process is assumed by the distribution rights holder. Accordingly, the distribution rights holder (which may be the content production firm) and the electronic delivery business operator both are in a position to know the encryption key regardless of whether the distribution rights holder alone, or the electronic delivery business operator alone, or both, distribute the key information. Nevertheless, these operation platforms provide better system security than conventional delivery arrangements.

Further operation platforms are represented as items 7-9 in FIG. 18 in which the coding process is assumed by the electronic delivery business operator and the distribution rights holder only generates the encryption key. The distribution rights holder and the electronic delivery business operator both are in a position to know the encryption key regardless of whether the distribution rights holder alone, the electronic delivery business operator alone, or both, distribute the key information. Nevertheless, these operation platforms provide better system security than conventional delivery arrangements.

Still further operation platforms are represented as items 10-12 in FIG. 18 wherein the electronic delivery business operator generates the encryption key while the distribution rights holder receives the encryption key from the electronic delivery business operator to encrypt the digital data. Hence, the distribution rights holder and the electronic delivery business operator both are in a position to know the encryption key regardless of who delivers the key information. Nevertheless, these operation platforms provide better system security than conventional delivery arrangements.

Yet other operation platforms are represented as items 13-15 in FIG. 18, wherein the electronic delivery business operator generates the encryption key and encrypts the content with that key while the distribution rights holder 1 carries out coding only. Still further operation platforms are represented as items 16-18 in FIG. 18, wherein the electronic delivery business operator generates the encryption key, codes the content and then encrypts the coded content. In these cases, the distribution rights holder and the electronic delivery business operator both are in a position to know the encryption key regardless of who delivers the key information. Nevertheless, these operation platforms provide better system security than conventional delivery arrangements.

In accordance with the present invention, plural sets of key information specific to the recipient at respective destinations are generated. The multiple sets of key information are delivered separately over a plurality of routes which differ from the route used to deliver the digital data and which further differ from each other. The inventive delivery method thus makes it difficult for an unscrupulous party to acquire at once all information needed to restore the encryption key.

While the present invention has been particularly shown and described with reference to certain preferred embodiments, it will be understood that various changes and modifications may be made without departing from the spirit and scope of this invention. It is intended that the appended claims be interpreted to cover the disclosed embodiments and all equivalents thereto.

What is claimed is:

1. A digital data delivery method for use in delivering digital data from an upstream system to a downstream system, said upstream system providing multipoint delivery of encrypted digital data to specific destinations, and said downstream system decrypting the delivered digital data, said method comprising the steps of:

encrypting digital data at said upstream system using an encryption key;

generating on the basis of said encryption key, sets of passkeys, each set having at least two passkeys and each set of passkeys specific to a respective one of said specific destinations by dividing said encryption key by a division pattern that is: (a) unique to each of said specific destinations and (b) based on the content of said digital data;

generating a plurality of partial keys based on a portion of the passkeys in said set or a portion of passkey information from which said passkeys may be reproduced;

delivering either said plurality of partial keys or partial key information, from which said partial keys may be reproduced, and delivering the remaining passkeys in a set not used to generate said partial keys or the remaining passkey information, to a respective one of said specific destinations over a plurality of delivery routes which differ from routes for delivering said digital data and which are further different from each other;

delivering the encrypted digital data;

restoring said encryption key by using said downstream system using either said plurality of partial keys or said partial key information and using either said remaining passkeys or said remaining passkey information in a set delivered over said plurality of delivery routes; and using the restored encryption key to decrypt the encrypted digital data.

2. The method of claim 1, wherein a set of said partial keys is generated by dividing a portion of said set of passkeys specific to a destination by a predetermined division pattern specific to the destination of said set of partial keys.

3. A signal processing method for use with an upstream system providing multipoint delivery of encrypted digital data to specific destinations, said method comprising the steps of:

encrypting digital data at said upstream system using an encryption key;

generating on the basis of said encryption key, sets of passkeys, each set having at least two passkeys and each set of passkeys specific to a respective one of said specific destinations by dividing said encryption key by a division pattern that is: (a) unique to each of said specific destinations and (b) based on the content of said digital data;

generating a plurality of partial keys based on a portion of the passkeys in said set or a portion of passkey information from which said passkeys may be reproduced;

delivering either said plurality of partial keys or partial key information, from which said partial keys may be reproduced, and delivering the remaining passkeys in a set not used to generate said partial keys or the remaining passkey information, to a respective one of said specific destinations over a plurality of delivery routes which differ from routes for delivering said digital data and which are further different from each other; and delivering the encrypted digital data.

4. The method of claim 3 wherein a set of said partial keys is generated by dividing a portion of said set of passkeys specific to a destination by a predetermined division pattern specific to the destination of said set of partial keys.

5. A digital data delivery system comprising an upstream system providing multipoint delivery of encrypted digital data to specific destinations and a downstream system decrypting the delivered digital data;

said upstream system including:

an encrypting element for encrypting digital data using an encryption key;

a first key information generator for generating, on the basis of said encryption key, sets of passkeys, each set having at least two passkeys and each set of passkeys specific to a respective one of said specific destinations by dividing said encryption key by a division pattern that is: (a) unique to each of said specific destinations and (b) based on the content of said digital data;

a second key information generator for generating a plurality of partial keys based on a portion of the passkeys in said set or a portion of passkey information, from which said passkeys may be reproduced;

a key information delivery element for delivering either said plurality of partial keys or partial key information, from which said partial keys may be reproduced, and for delivering the remaining passkeys in a set not used to generate said partial keys or the remaining passkey information, to a respective one of said specific destinations over a plurality of delivery routes which differ from routes for delivering said digital data and which are further different from each other; and a digital data delivery element for delivering the encrypted digital data;

and said downstream system including:

an encryption key restoring element for restoring said encryption key using either said plurality of partial keys or said partial key information and using either said remaining passkeys or said remaining passkey information in a set delivered over said plurality of delivery routes; and a decrypting element for decrypting the encrypted digital data using the restored encryption key.

6. An upstream system for providing multipoint delivery of encrypted digital data to specific destinations, comprising:

an encrypting element for encrypting digital data using an encryption key;

a first generator for generating on the basis of said encryption key, sets of passkeys, each set having at least two passkeys and each set of passkeys specific to a respective one of said specific destinations by dividing said encryption key by a division pattern that is: (a) unique to each of said specific destinations and (b) based on the content of said digital data;

a second generator for generating a plurality of partial keys based on a portion of the passkeys in said set or a portion of passkey information from which said passkeys may be reproduced;

a key information delivery element for delivering either said plurality of partial keys or partial key information, from which said partial keys may be reproduced, and delivering the remaining passkeys in a set not used to generate said partial keys or the remaining passkey information, to a respective one of said specific destinations over a plurality of delivery routes which differ from routes for delivering said digital data and which are further different from each other; and a digital data delivery element for delivering the encrypted digital data.

7. The system of claim 6, wherein said second key information generator generates a set of said partial keys by dividing a portion of said set of passkeys specific to a destination by a predetermined division pattern specific to the destination of said set of partial keys.

8. A storage medium which stores a computer-readable program for controlling the steps of:

encrypting digital data using an encryption key;

generating on the basis of said encryption key, sets of passkeys, each set having at least two passkeys and each set of passkeys specific to a respective one of specific destinations by dividing said encryption key by a division pattern that is: (a) unique to each of said specific destinations and (b) based on the content of said digital data;

generating a plurality of partial keys based on a portion of the passkeys in said set or a portion of passkey information from which said passkeys may be reproduced;

delivering either said plurality of partial keys or partial key information, from which said partial keys may be reproduced, and delivering the remaining passkeys in a set not used to generate said partial keys or the remaining passkey information, to a respective one of said specific destinations over a plurality of delivery routes which differ from routes for delivering said digital data and which are further different from each other; and performing multipoint delivery of the encrypted digital data to said specific destinations.

9. The storage medium of claim 8, wherein a set of said partial keys is generated by dividing a portion of said set of passkeys specific to a destination by a predetermined division pattern specific to the destination of said set of partial keys.

* * * * *